(12) United States Patent
Watson

(10) Patent No.: US 11,010,941 B1
(45) Date of Patent: *May 18, 2021

(54) MATCHED ARRAY GENERAL TALENT ARCHITECTURE SYSTEM AND METHOD

(71) Applicant: EffectiveTalent Office LLC, Chicago, IL (US)

(72) Inventor: Craig M. Watson, Chicago, IL (US)

(73) Assignee: EffectiveTalent Office LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/120,818

(22) Filed: Dec. 14, 2020

Related U.S. Application Data

(63) Continuation-in-part of application No. 16/914,755, filed on Jun. 29, 2020, now Pat. No. 10,896,529.
(Continued)

(51) Int. Cl.
*G06T 11/20* (2006.01)
*G06F 16/25* (2019.01)
(Continued)

(52) U.S. Cl.
CPC .......... *G06T 11/203* (2013.01); *G06F 16/252* (2019.01); *G06F 16/258* (2019.01); *G06T 19/006* (2013.01); *H04N 5/2224* (2013.01)

(58) Field of Classification Search
CPC .... G06T 11/203; G06T 11/206; G06F 16/252; G06F 16/258; G06Q 10/0639; G06Q 10/063114
See application file for complete search history.

(56) References Cited

U.S. PATENT DOCUMENTS 4,305,057 A   12/1981   Rolston
4,669,303 A   6/1987   Henry
(Continued)

FOREIGN PATENT DOCUMENTS

GB   2 027 227 A   2/1980

OTHER PUBLICATIONS

Badr, "Why Feature Correlation Matters . . . a Lot!", Towards Data Science Inc., Jan. 18, 2019, downloaded from internet website: https://towardsdatascience.com/why-feature-correlation-matters-a-lot-847e8ba439c4 on Apr. 23, 2019, 8 pages.
(Continued)

*Primary Examiner* — Merilyn P Nguyen
(74) *Attorney, Agent, or Firm* — Faegre Drinker Biddle & Reath LLP

(57) ABSTRACT

A matched array technology system and method for displaying in a two-dimensional array the structured interactions between management and a plurality of employees in an organization. Axes contain proxy values of employee and manager expectations scaled to yield a matched array and an alignment vector containing cells representing target alignment between employee and manager expectations. A scatter plot of multiple employee positions portrays the pattern of talent alignment and distribution, representing the talent architecture for the organization. The talent architecture is characterized by multiple static and dynamic metrics that identify normative opportunities to improve organization alignment, and measure organization talent management performance, especially in relation to the reference and general alignment vectors of the array.

23 Claims, 16 Drawing Sheets

Related U.S. Application Data which is a continuation-in-part of application No. 16/875,024, filed on May 15, 2020, now Pat. No. 10,769,825, which is a continuation of application No. 16/785,745, filed on Feb. 10, 2020, now Pat. No. 10,657,684, which is a continuation of application No. 16/679,840, filed on Nov. 11, 2019.

(60) Provisional application No. 62/781,915, filed on Dec. 19, 2018, provisional application No. 62/810,610, filed on Feb. 26, 2019.

(51) Int. Cl.
    *H04N 5/222* (2006.01)
    *G06T 19/00* (2011.01)

(56) References Cited

U.S. PATENT DOCUMENTS

| | | | |
|---|---|---|---|
| 5,299,455 | A | 4/1994 | Mangalam |
| 5,382,954 | A | 1/1995 | Kennedy, Jr. et al. |
| 5,823,479 | A | 10/1998 | Nield et al. |
| 6,304,670 | B1 | 10/2001 | Berestov |
| 6,486,799 | B1 | 11/2002 | Still et al. |
| 6,982,655 | B2 | 1/2006 | Vialleton et al. |
| 7,036,085 | B2 | 4/2006 | Barros |
| 7,630,986 | B1 | 12/2009 | Herz et al. |
| 7,707,061 | B2 | 4/2010 | van der Linde |
| 7,904,848 | B2 | 3/2011 | Coene et al. |
| 9,292,857 | B2 | 3/2016 | Averbuch |
| 9,335,901 | B1 | 5/2016 | Pantel |
| 9,483,162 | B2 | 11/2016 | Mingione |
| 9,495,222 | B1* | 11/2016 | Jackson .............. G06F 9/52 |
| 9,788,031 | B2 | 10/2017 | Meyer |
| 10,157,173 | B2 | 12/2018 | Villani |
| 10,521,778 | B2* | 12/2019 | Bull ............ G06Q 20/227 |
| 10,565,599 | B2* | 2/2020 | Rodkey .......... G06Q 30/06 |
| 10,770,181 | B2* | 9/2020 | Bull .......... G06F 16/24578 |
| 2004/0183699 | A1 | 9/2004 | Vialleton et al. |
| 2006/0093222 | A1 | 5/2006 | Saffer et al. |
| 2008/0082931 | A1* | 4/2008 | Morrel-Samuels .... G06Q 30/02 715/765 |
| 2009/0099894 | A1 | 4/2009 | Carden et al. |
| 2010/0010968 | A1 | 1/2010 | Redlich et al. |
| 2010/0113159 | A1 | 5/2010 | Chapman et al. |
| 2011/0004504 | A1* | 1/2011 | Ives ............ G06Q 30/0201 705/7.29 |
| 2012/0221788 | A1 | 8/2012 | Raghunathan |
| 2015/0006415 | A1* | 1/2015 | Xu ............ G06Q 10/0639 705/320 |
| 2015/0077592 | A1 | 3/2015 | Fahey |
| 2016/0162478 | A1 | 6/2016 | Blassin et al. |
| 2016/0371625 | A1 | 12/2016 | Mosley et al. |
| 2017/0032017 | A1 | 2/2017 | Morinaga et al. |
| 2017/0053623 | A1 | 2/2017 | Purayil et al. |
| 2017/0075557 | A1 | 3/2017 | Noble et al. |
| 2017/0090482 | A1 | 3/2017 | Zammit-Mangion et al. |
| 2017/0168680 | A1 | 6/2017 | Fourneau-Pelletier et al. |
| 2017/0170968 | A1 | 6/2017 | Zhang et al. |
| 2017/0177808 | A1 | 6/2017 | Irwin et al. |
| 2017/0178135 | A1 | 6/2017 | Bull et al. |
| 2017/0206292 | A1* | 7/2017 | Bennett ............ G06F 30/20 |
| 2018/0137541 | A1 | 5/2018 | Yelton et al. |
| 2018/0165254 | A1 | 6/2018 | Talati |
| 2018/0181693 | A1 | 6/2018 | Yang |
| 2018/0350116 | A1 | 12/2018 | Ruble et al. |
| 2019/0026681 | A1 | 1/2019 | Polli et al. |
| 2019/0033861 | A1 | 1/2019 | Groden et al. |

OTHER PUBLICATIONS

Buckingham et al., "Reinventing Performance Management," Harvard Business Review, Apr. 2015, 14 pages.

PCT Search Report and Written Opinion issued in related application PCT/US2020/059951, dated Mar. 4, 2021, 11 pages.

Office Action issued in related U.S. Appl. No. 17/067,133, dated Mar. 9, 2021, 9 pages.

\* cited by examiner

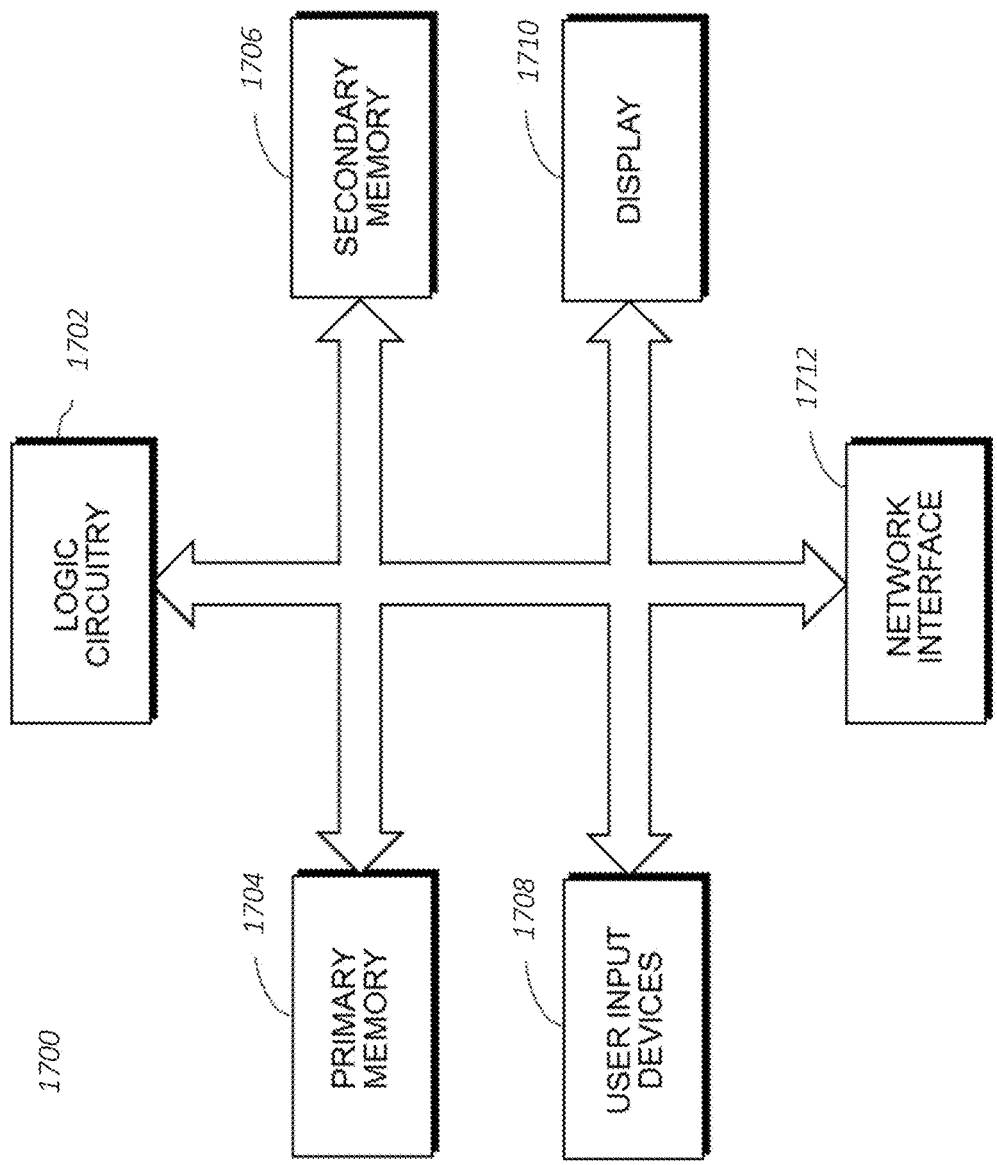

MATCHED ARRAY GENERAL TALENT ARCHITECTURE SYSTEM AND METHOD

CROSS-REFERENCE TO RELATED APPLICATIONS

The present application is a continuation-in-part of U.S. patent application Ser. No. 16/914,755, filed on Jun. 29, 2020, now U.S. Pat. No. 10,896,529, which is a continuation-in-part of U.S. patent application Ser. No. 16/875,024, filed on May 15, 2020, now U.S. Pat. No. 10,769,825, which is a continuation of U.S. patent application Ser. No. 16/785,745, filed on Feb. 10, 2020, now U.S. Pat. No. 10,657,684, which is a continuation of U.S. patent application Ser. No. 16/679,840, filed on Nov. 11, 2019, which claims the priority benefit of U.S. Provisional Patent Application No. 62/781,915, filed on Dec. 19, 2018, and U.S. Provisional Patent Application No. 62/810,610, filed on Feb. 26, 2019, each of which is incorporated herein by reference in its entirety.

TECHNICAL FIELD

The present disclosure is related generally to electronic display of system performance, and more particularly to a method and computing system for aligning two variables to produce a target result or acceptable range of results.

BACKGROUND

A number of operational systems depend on the alignment of two different measures to efficiently or safely produce desired results. Such operations generally require a human operator's expertise and continual evaluation of the two different variables, often viewed on different gauges involving different metrics, and relying on measurement, experience, or "feel," to keep the system within operational parameters that yield the desired outcomes. Examples include chemical processes in which an exact and dynamic combination of heat and pressure is required to produce a specific compound, or aircraft flight operations in which an exact and dynamic combination of airspeed and angle-of-attack can mean the difference between a safe landing and loss of control. Such joint optimization situations involve coordinating the changing values of differently-measured variables, adjusting them together over a defined range, and keeping them within required bounds until target outcomes are achieved. Ordinarily, a significant effort is required to keep the operating variables aligned, and in some cases, failure to do so can result in a range of operating failures, including wasted product or even explosions in chemical environments; and accidents on takeoff and landing in flight.

Joint optimization problems extend to non-technical contexts as well. Wherever close coordination of two dimensions of a system is essential, the same requirements come into play. Investment portfolio management turns on optimizing risk and return across changing asset classes. Effective human resource management requires assessing whether employees are "meeting expectations." Here, optimizing alignment between management's expectations and employee's desire for advancement creates a joint optimization setting just as compelling as any engineering challenge. The alignment of talent across a plurality of employees presents even greater challenges addressed here using matched array technology.

DRAWINGS

While the appended claims set forth the features of the present techniques with particularity, these techniques may be best understood from the following detailed description taken in conjunction with the accompanying drawings of which:

FIG. 17 shows a computing device on which the techniques described herein may be carried out.

DETAILED DESCRIPTION

This disclosure is generally directed to a system and method for displaying (e.g., on a display device) in a two-dimensional array the structured interaction of two variables moving in tandem to achieve a target outcome (for example, balancing heat and pressure in a chemical reaction to yield a given compound). In various embodiments, the feasible values of the two system operating variables are represented by proxy values of X and Y scaled so that the range and interval of the X- and Y-axes are the same, and configured so that whenever the system is in an equilibrium or optimal state, the proxy value of X and equals the proxy value of Y. The resulting display has at least two distinct features: first, it forms a "matched array" of all operationally-relevant X,Y intersections, and second, the points at which the system is in equilibrium or at an optimum (the same points at which proxy values of X and Y are equal) all lie along a unique, clearly-delineated center diagonal of the displayed output (e.g., on a display device) referred to herein as the "alignment vector."

According to an embodiment, wherever on the display X and Y intersect, cells of the display can reflect several indicators of use to system operators: the values of the underlying operating variables, their proximity to the optimal position along the alignment vector, and the direction and extent of adjustments needed to reach the alignment vector to achieve optimal system performance. The presentation of the display can be on a display device (such as a computer monitor) including a matrix with shading and colors reflecting values relative to the alignment vector.

In an embodiment, the matched array system indicates the proximity to or distance from the optimal position of the X,Y values with an audible warning. In one implementation, the output is in an airplane cockpit instrument, in which the audio warnings sound when the X,Y intersection is dangerously far from the alignment vector, and with instructions on what to do to return to the desired flight path.

In an embodiment, the matched array system operates in two modes: normative, as in the above examples, in which the monitor or instrument provides information to be acted upon; and positive, in which the system, acting on the same information, automatically makes the needed adjustments to move the system toward the operating state represented by the alignment vector.

According to various embodiments, a "matched array" system and method facilitates coordinated achievement of joint optimization results using a computerized display system and method that combines the two different metrics in one display, and articulating optimal settings along a unique "alignment vector." The result is easier achievement of more consistently optimal performance, even by less experienced users.

Figure 1:
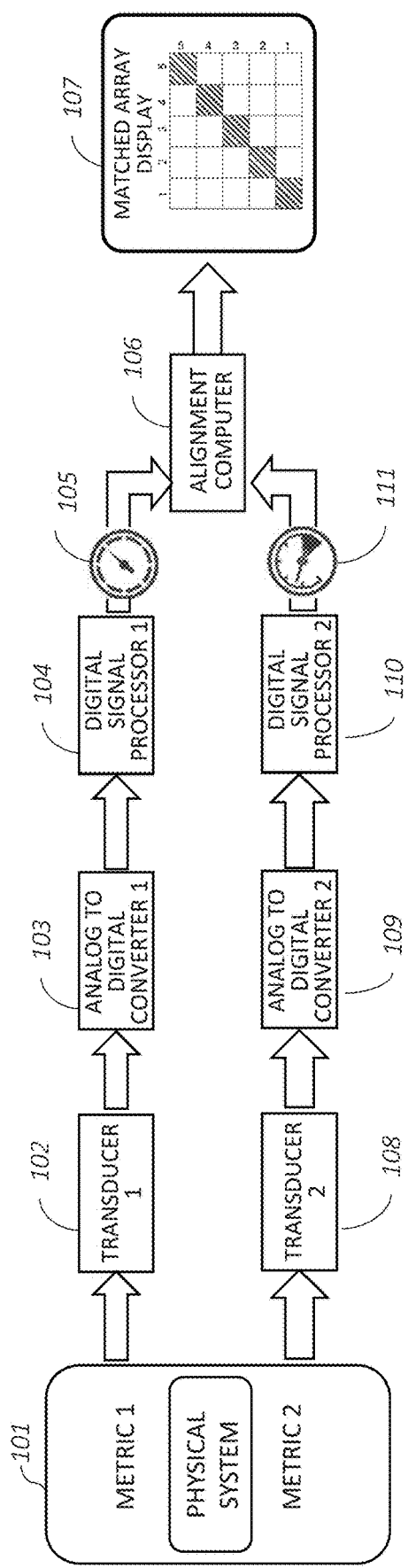
FIG. 1 is a representation of a matched array system receiving physical input (e.g., pressure, heat, or electrical inputs from a system such as a chemical or mechanical system), according to an embodiment.

Turning to FIG. 1, the operation of a matched array system according to an embodiment will now be described. In this embodiment, the matched array system receives physical input (e.g., pressure, heat, or electrical inputs from a system such as a chemical or mechanical system) from a physical system 101. The physical system 101 is similar to one that might be found in a chemical process in which the collected metrics indicate physical phenomena such a pressure, heat, or mechanical impulses. The physical input is received by a transducer 102, which translates it into analog electrical signals. These analog electrical signals are received by an analog-to-digital (A/D) converter 103, which converts the analog signals into digital signals. The digital signals are provided to a digital signal processor (DSP) 104, which processes (e.g., filters) the signals into a form that is usable by a meter 105 or other device for displaying measurements. The processed signal is also used by an alignment computer 106 (which can be implemented as a separate hardware processor such as a controller or microprocessor, or as a computing device such as that shown in FIG. 17) that analyzes the range of feasible values of x and (later) y to determine a corresponding set of proxy values that form the X and Y axes of a matrix display. The alignment computer 106 controls a display device 107 (to display a matched array). A parallel set of actions is taking place in in a second transducer 108, a second A/D converter 109, and a DSP 110, resulting in a signal 111 input to the alignment computer 106. The alignment computer 106 converts x and y metrics to proxy values that have the same range and interval on the X and Y axes, respectively. The display device 107 plots the proxy values as an intersection on the matched array (i.e., in response to actual metric 1 and 2 data received).

Figure 2:
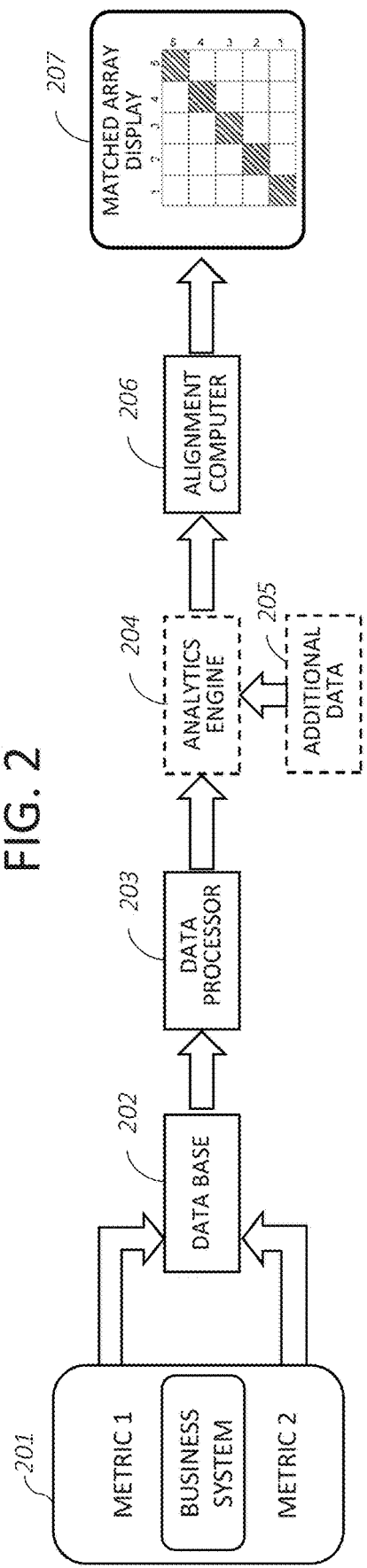
FIG. 2 is a representation of a matched array system receiving different data streams (from an administrative system), comparing them, and displaying them to optimize a process, according to an embodiment.

In FIG. 2, the operation of a matched array system according to an additional embodiment is illustrated. In this embodiment, the matched array system receives data (e.g., business or financial information) from a business system 201 (e.g., a computing device such as that shown in FIG. 17). A data base 202 receives metric 1 and metric 2 data from the business system and feeds them into a data processor 203 (e.g., a computing device such as that shown in FIG. 17) which modifies the data for meaningful manipulation in later stages (e.g., conversion to log numbers, multiplication by a relevant coefficient, formatting). In an embodiment, an additional optional step processes the two data elements through an analytics engine 204 that might also, for example, combine the data received with additional data 205, or otherwise enhance, interpret, or modify the data for processing by an alignment computer 206 (which can be implemented as a separate hardware processor such as a controller or microprocessor, or as a computing device such as that shown in FIG. 17). The alignment computer 206 converts the two variables to proxy values that have the same range and interval on the X and Y axes, respectively, enabling them to be plotted together on a matched array display 207.

Figure 3:
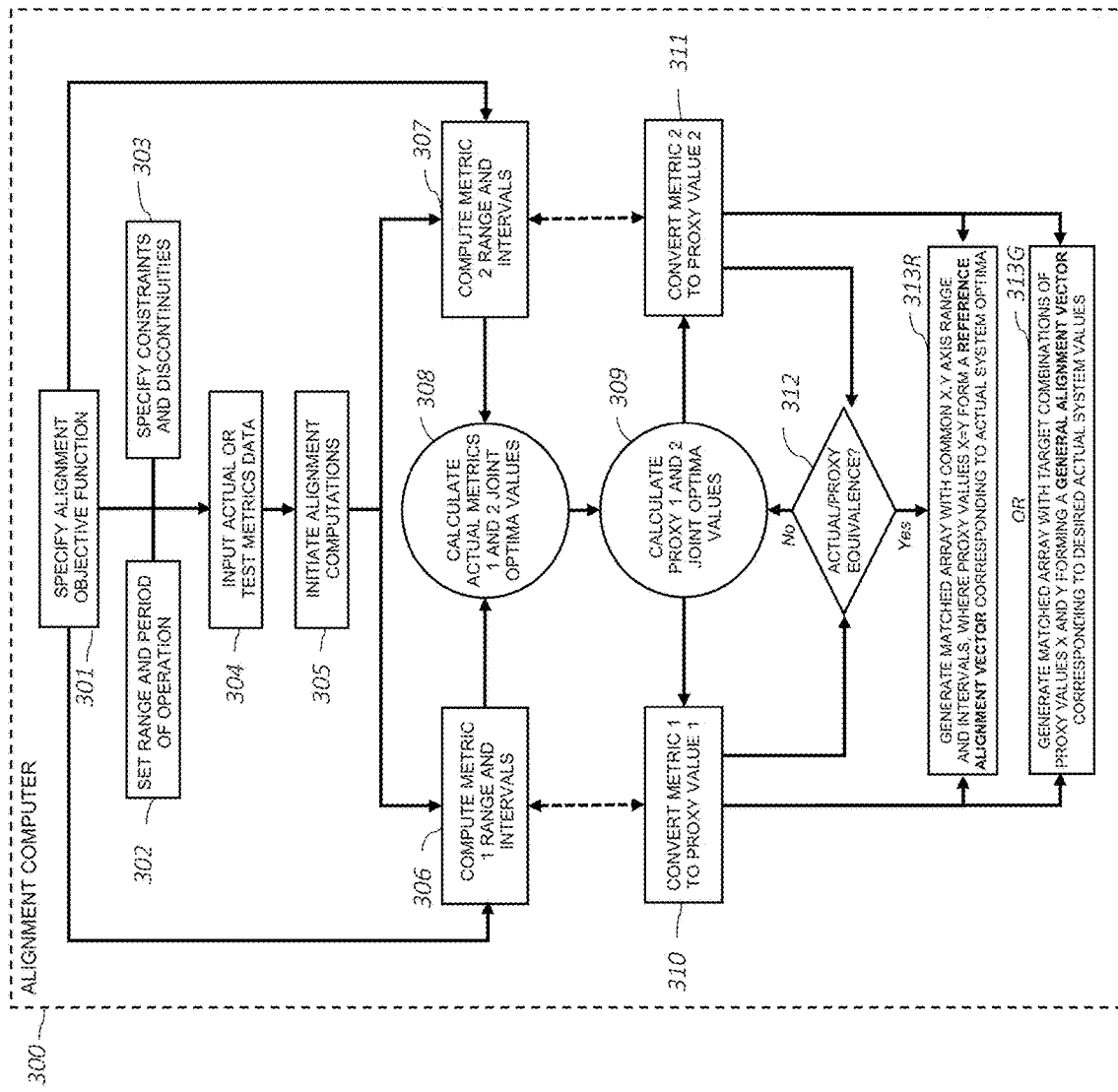
FIG. 3 is a process flow diagram showing steps involved in setting up a matched array system, according to an embodiment.

FIG. 3 portrays an "alignment computer" 300 (which can be implemented as a separate hardware processor such as a controller or microprocessor, or as a computing device such as that shown in FIG. 17) and the series of actions it implements to calibrate the axes of the matched array system so that when the overall system is at an optimum or in equilibrium, proxy values for x and y are equal. The matched array system can portray optimum or equilibrium positions when two conditions are present: first, each proxy value axis X or Y must be able to represent the relevant range of the underlying operating metrics; and second, the range and interval of the proxy values are the same. When these conditions exist, intersection set x=y will lie along the center diagonal of a rectilinear array. When the system designer or alignment computer follows these guidelines, the matched array will be properly calibrated, and the settings will be applicable to the foreseeable functioning of the matched array system in much the same way that the scale of a car's speedometer does not have to be re-calibrated for each trip.

In an embodiment in FIG. 3, a system designer or a microprocessor sets three specific conditions that support alignment computer operations: the operating system objective function 301 (e.g., product yield, aircraft flight orientation), the range and period of operation of the underlying operating system 302, and any constraints and discontinuities 303 that apply to the metrics of the underlying operating system. Together, these settings ensure that the matched array system can search and calculate proxy values within the appropriate feasible range of values for x and y when a system operator, or alternatively a microprocessor or transducer, introduces test or actual operating data to the matched array system database 304. In an embodiment, after receiving the data, or alternatively concurrent with the receipt of data, a system operator may manually, or a microprocessor may automatically, initiate the alignment computer process 305 (e.g., an alignment process carried out on a controller or microprocessor, or computing device such as that shown in FIG. 17) based on the data received.

An alignment computer (which can be implemented as a separate hardware processor such as a controller or microprocessor, or as a computing device such as that shown in FIG. 17) begins calculating the eventual alignment between proxy values for the actual operating metrics by first computing the range and interval of operating system metrics 1 and 2 in steps 306 and 307. The alignment computer then calculates at step 308 the subset of matched operating metric settings for which values the underlying system is stable or optimal in achieving the objective function specified in 301. Using the range and intervals of the operating metrics 1 and 2 of the underlying system, and the specific joint optima computed in step 308, the matched array computer calculates in step 309 the set of optimal proxy value combinations corresponding to the optimal operating metrics 1 and 2. Working from this set of optimal x and y proxy values, and incorporating the range and intervals reflected in the actual operating data, the alignment computer converts metric 1 and 2 operating data to proxy values 1 and 2 at steps 310 and 311. For purposes of the matched array, this process computes the values along the center diagonal—the alignment vector—and then identifies all related values (optimal or not) along the X and Y axes. The alignment computer calculates proxy values iteratively, checking that the proxy values correspond to the optimal operating values in step 312, and stopping when the equivalence between proxy and operating values has been established, indicating that the condition of proxy value equality at x=y corresponds directly to the optimality of the underlying operating system values ("proxy-operating equivalence").

When the alignment computer has established proxy-operating equivalence in step 312, all the conditions for specifying the matched array display are established for both the diagonal or reference alignment vector in 313R and the general alignment vector in 313G:

the operating ranges and relevant intervals for metrics 1 and 2 have been identified;

the subset of operating ranges and relevant intervals of metrics 1 and 2 values for which the operating system is stable, optimized, or at equilibrium have been identified, thus defining the combinations of values represented along the reference alignment vector in 313R, or the general alignment vector in 313G;

the corresponding set of target proxy values of metrics 1 and 2 have been designated and their equivalence to the desired operating metrics validated;

For the reference alignment vector in matched array 313R:

the common range and interval for the X and Y axes of proxy values 1 and 2 have been specified, delineating a rectilinear matched array;

every point at which proxy value x equals proxy value y in 313R represents an optimal, equilibrium, or target state of the underlying operating system;

the range of values at which x=y designates the center diagonal of the matched array, called a "reference alignment vector;"

For the general alignment vector in matched array 313G:

every point at which specific combinations of proxy value x and proxy value y in matched array 313G represent an optimal, equilibrium, or target state of the underlying operating system;

the combinations of proxy values of x and y represent a configuration of such target values in the matched array 313G called a "general alignment vector," which in an embodiment may or may not assume any form on the matched array.

The alignment computer generates a matched array display at block 313R, including a matrix of feasible intersection points in the array of X and Y values, and a "reference (diagonal) alignment vector" of all intersection points for which the proxy value of x equals the proxy value of y. Alternatively, the alignment computer can generate a matched array at block 313G wherein a matrix of feasible intersection points in the array of X and Y values may also incorporate a "general alignment vector" consisting of any combination of proxy values of x and y for which target or desired system performance is achieved. Hereinafter, the term, "alignment vector," refers interchangeably to general or reference alignment vector types. Moreover, as illustrated, the "general alignment vector" may not be straight, as the case with a classical vector. Instead, the concepts herein are illustrated with respect to the "general alignment vector" that can represent a target or desired range that may not be straight.

For any embodiment of the system in which the conditions and optima remain generally the same, this setup process is implemented once and its results will apply to all reasonably similar cases, in much the same way the settings on an instrument gauge are calibrated to reflect the known parameters and limits of the system being measured, then applied to all instruments produced, and used in all reasonably foreseeable operating conditions.

Figure 4:
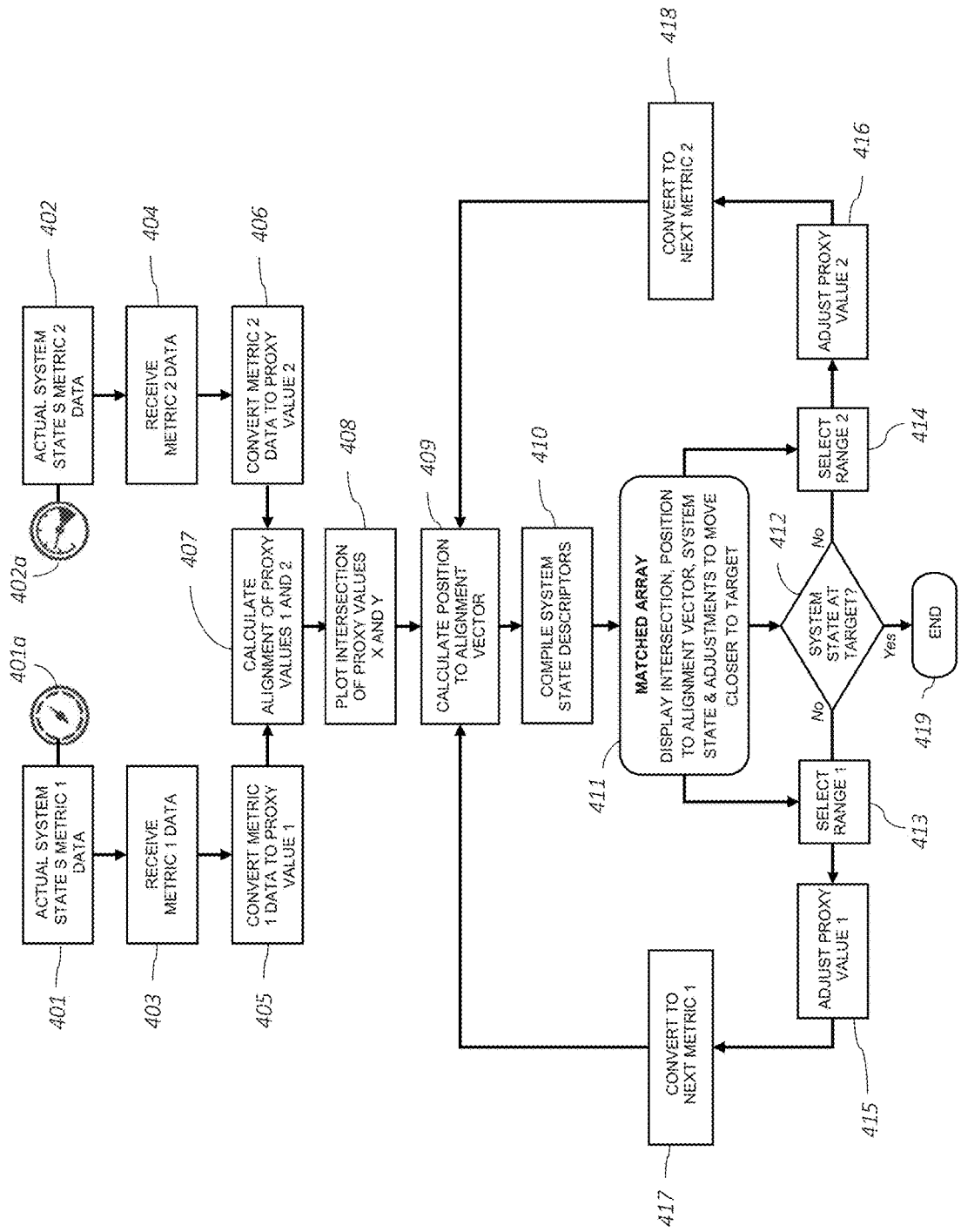
FIG. 4 is a flow chart that depicts a process in which there are inputs to and outputs from a matched array system, wherein an output from the matched array system (e.g., shown on a display device) is a set of instructions a user can follow to adjust system variables to achieve "normative" optimization, according to an embodiment.

FIG. 4 shows an embodiment of the matched array system (e.g., a computing device such as the one depicted in FIG. 17) that generates instructions an operator can follow to reach a desired target state in the underlying operating system (e.g., software executing on a computing device such as the one depicted in FIG. 17). These instructions are not implemented by the system, but represent the "normative" series of prescriptive adjustments a system operator should follow to achieve the target state as it responds to changing metric 1 and metric 2 data received. The matched array system in such an embodiment shows one or multiple steps that move from a current position toward the alignment vector. Because the alignment vector represents proxy-operating equivalence, these steps represent provisional changes that move toward optimization in the underlying operating system.

Actual operating metrics data generated by the underlying system 401 and 402 are displayed in an embodiment on the meters 401a and 402a. The alignment computer receives metric data 1 and 2 in blocks 403 and 404 in an embodiment and converts them in steps 405 and 406 to their respective proxy values. The alignment computer then calculates alignment between proxy values 1 and 2 at step 407, generating the matched array. The matched array system then plots the intersection of these values on the matched array at step 408. The matched array system then calculates at 409 the position of the resulting intersection in relation to the alignment vector on the matched array. The distance and direction of the plotted position relative to the alignment vector reflects the state of the system and the effort and direction required to achieve proxy value alignment which signals optimization or equilibrium in the underlying operating system. The matched array system state monitor (e.g., software executing on the same computing device as the matched array system) generates a compilation of system data at 410, creating a complete picture of system performance and status for review and interpretation by the system operator.

In alternate embodiments, the system state monitor 410 can show system state and performance in the form of a colored light, with different colors indicating the degree of system stability, risk, or other dimensions of performance. A more complex system state indicator on the matched array 411 can, in various alternate embodiments, generate detailed lists of original metrics, proxy values, implicated stability metrics (e.g., temperature or pressure limits approached or exceeded), recommended rate and direction of change, degrees of adjustment needed, as well as the estimated speed and time to recovery or attainment of optimization in the underlying system. The matched array system continually checks if an optimum is attained at step 412 by comparing plotted values to the alignment vector values. In an embodiment, the matched array system continues to evaluate the relative values of system variables at steps 413 and 414 to determine which is closer to the alignment vector, potentially offering the more efficient path to alignment.

Further to FIG. 4, and acting on this information, the matched array system generates normative adjustments 415 and 416 in values for proxy values 1 and 2. In an embodiment, the matched array system receives the adjusted data 415, 416 and converts the updated proxy values to new actual system metrics 417 and 418. The projected results of making such normative adjustments will be reflected in changes in position relative to the alignment vector 409. The system can continue to iterate until projected optimization threshold value is reached at step 412, at which time the matched array system will cease proposing adjustments and come to rest at 419. In this normative mode, actual changes to the actual underlying operating environment will only have been made as a result of specific actions the system operator executes in response to the matched array system instructions.

Figure 5:
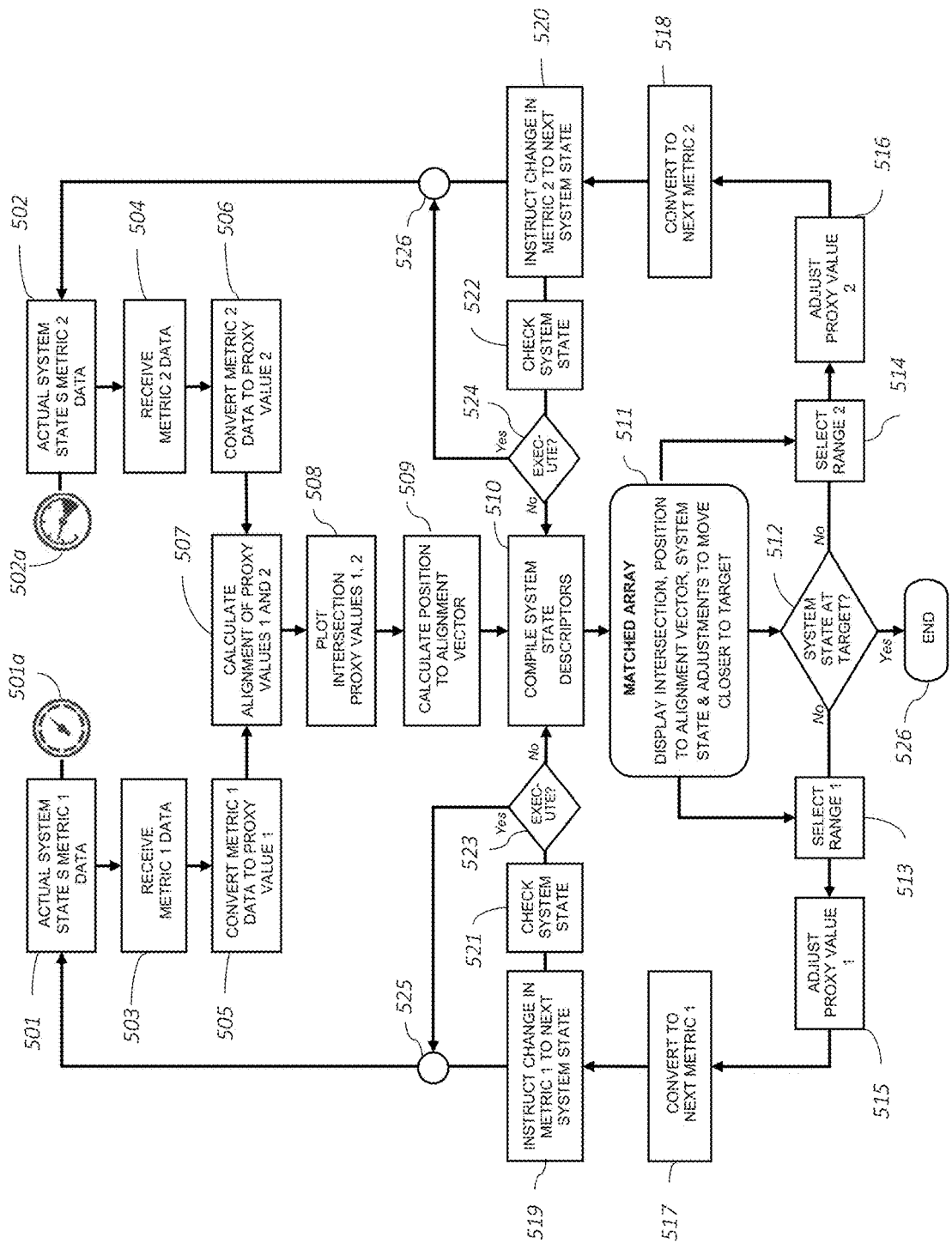
FIG. 5 is a flow chart depicting a process in which a matched array system directly instructs the physical system to take the actions dictated by the matched array position, thus automatically moving the physical system toward "positive" optimization, according to an embodiment.

Continuing to FIG. 5, note that the series of actions 501 to 518 are identical to those at blocks 401 to 418 in FIG. 4, encompassing all activities from the initial system metrics, to conversion and rendering on the matched array display, to the determination of proxy value adjustments needed to achieve optimization, and the conversion of these proxy values to updated operating metrics. Whereas the embodiment pictured in FIG. 4 stopped with directional instructions to a system operator, FIG. 5 illustrates an embodiment of the matched array system that further instructs the actual operating system to make specific underlying system adjustments consistent with approaching, and eventually reaching, the alignment vector on the matched array. Specifically, the matched array system instructs changes to underlying metrics 1 and 2, respectively, at steps 519 and 520 in line with the proxy value adjustments indicated in the matched array. In an embodiment as shown in FIG. 5, the instruction is issued but not acted upon until an operator checks the system state indicator displays 521 and 522 to view any changes that may have taken place since prior changes or from the initial state, and to review the projected impact of instructed adjustments 519 and 520 before they are executed by the matched array system.

Further to FIG. 5, in an embodiment, the system operator activates one or more switches 523 and 524, releasing the system (Yes, or preventing release, No) to make the system-proposed adjustments. If the switches are shifted to No, then the system takes no action other than to update state indicator display 510 which also captures any other changes in the system state. Alternatively, in such an embodiment, if the system operator releases the system at 523 and 524, the matched array system executes the instructions 519 and 520, and these directives are implemented in the operating system, working through the metric 1 and metric 2 actuators (or a related mechanism) 525 and 526. These adjustments generate actual system changes that move the system to a new state, causing the system to update metrics data 501 and 502. In this embodiment, the matched array system continues to receive and process actual system data, processes this information relative to proxy values, and iterates closer to the alignment vector as long as this is unimpeded by an operator instruction or internal system rule that interrupts or counters the system operation. The system will continue to process instructions to new positions in the matched array display 511, continually tracking plotted positions relative to the alignment vector. In an embodiment, the matched array system will iterate to an optimized state until the alignment vector is reached, meaning proxy value x=proxy value y, causing the switch 512 to acknowledge optimization, and ending the cycle at system stopping point 526.

Next is an application of the matched array system and alignment vector technologies applied to a critical use case of aircraft flight. Experts have argued that most pilots do not understand the relationship between airspeed and angle of attack, as evidenced by the high incidence of "loss of control" flight accidents. Angle of attack (AOA) is the angle between the oncoming air and a reference line along the fuselage or wing of an airplane. On takeoff, the pilot pulls back on the control stick or wheel to lift the nose of the aircraft so angle of attack relative to oncoming wind maximizes lift at a given airspeed. The amount of lift needed for an aircraft to achieve takeoff, to stay in flight, to maneuver, and to land, is directly related to the interaction of AOA and airspeed. While other variables enter consideration (weight which is constantly changing as fuel is consumed, aerodynamic drag, and forces exerted due to maneuvers), the "angle of attack challenge" refers to the criticality of maintaining the proper relationship between the airspeed and AOA to control lift so the aircraft gains altitude, stays aloft, or loses altitude in a controlled fashion (as in landing) as the pilot intends. The correct combinations of airspeed and AOA are essential to safe flight. When the angle of attack is too steep at a given airspeed, there is insufficient lift, resulting in a stall. Alternatively, if the angle of attack is correct, say nose down for landing, but airspeed is insufficient to maintain lift, a stall can also be precipitated causing loss of control. Accordingly, airspeed and AOA are two variables that move in tandem with one another to achieve optimal or equilibrium flight performance. Being able to visualize and adjust both together in a single instrument, as in the matched array system, would potentially avoid many loss of control accidents that occur due to the pilot's excessive focus on one instrument or flight condition (speed or AOA), rather than both together.

Figure 6:
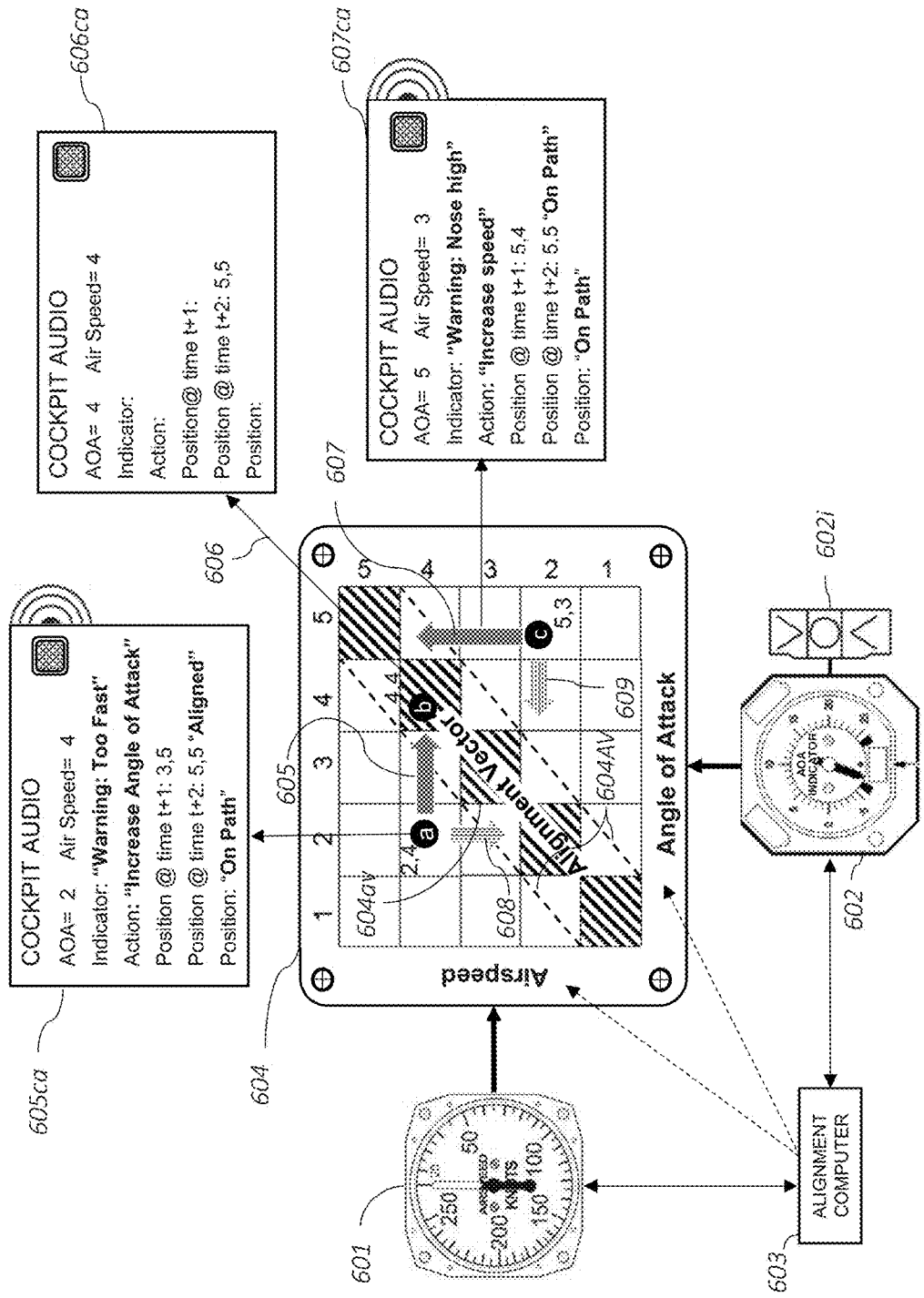
FIG. 6 illustrates an example use case for a matched array system configured according to an embodiment involving the coordination of aircraft airspeed and angle of attack.

FIG. 6 is an embodiment of matched array and alignment vector technologies (e.g., implemented on a computing device such as the one depicted in FIG. 17) applied to the combination of airspeed and AOA in a single display, enabling assignment of jointly-optimal values for both variables along the alignment vector. Among the instruments customarily installed in modern aircraft are an airspeed indicator 601 and an AOA indicator 602. The latter is sometimes accompanied by an AOA index meter 602i, a simple, color-coded up, down, and on-target indicator to guide the pilot to increase, decrease, or hold angle of attack to prevent a stall at a given airspeed. Airspeed and AOA already represent electronic signals that can be translated into digital inputs using the physical system process described in FIG. 1. An alignment computer 603 (which can be implemented as a separate hardware processor such as a controller or microprocessor, or as a computing device such as that shown in FIG. 17) implements the alignment computing process outlined in FIG. 3, setting the axes on the matched array, and establishing the alignment vector. The range of possible airspeeds and safe angles of attack are specific to the aircraft and incorporated; they will already have been established by a system designer, and the relevant range of each variable is input to the matched array to generate the aligned values for which takeoff, level flight, and final approach/landing scenarios are identified. Accordingly, the axes on the matched array display 604 show the proxy values x and y corresponding to the combinations of airspeed and AOA that reflect optimal and safe combinations of airspeed and angle of attack.

Continuing with FIG. 6, an airspeed/angle of attack matched array system 604 is shown, along with a set of airspeed and AOA plotted positions a, b, and c. These positions are associated with cockpit audio announcement scenarios shown in the surrounding panels 605ca, 606ca, and 607ca. Each scenario represents an actual airspeed-AOA combination shown on individual instruments and represented together by a single proxy value on the matched array. At position 'a,' airspeed proxy value is 4 and angle of attack proxy value is 2. Vector 605 shows a direction and range of needed adjustment that is sufficiently far from the alignment vector that cockpit annunciator 605ca issues a warning with the instruction to increase angle of attack. In this embodiment, the system emits an audible warning over cockpit audio, "Warning: Too Fast," indicating too high a speed for the AOA setting, and recommending a steeper angle of attack. At position 'b,' airspeed and AOA are aligned and no adjustment is needed, so the cockpit audio system 606ca does not issue any correction. At position 'c,' by contrast, the AOA is quite steep, and the airspeed too relatively slow for safe flight. As a result, the matched array system 604 causes the cockpit audio system to issue a warning at cockpit audio 607ca, signaling a "Warning: Nose High" condition and the associated announcement 607ca to "Increase Speed."

Further to FIG. 6, arrows 608 and 609 indicate alternative pathways to returning to the alignment vector, by either reducing airspeed at vector 608 for a given angle of attack (for example, during landing) or decreasing AOA along vector 609 at a given airspeed (to maintain level flight). Which pathway represents the preferred course of action depends on the specifics of the situation. In either case, returning to the alignment vector on the matched array provides the appropriate normative guidance to the pilot on how to avoid a loss of control or return the aircraft to stable flight.

In the warning scenarios pursuant to the embodiment described, the priority of direction (to adjust airspeed or AOA) can be predetermined by the value of the metric or according to the specifics of the scenario (e.g., nose down and slowing speed for final approach and landing might prioritize AOA adjustment vs slower speed). This use case follows the normative mode of operation in which instructions are issued and no automated action taken by an associated control system. In an alternate embodiment, the matched array system can operate in positive mode, sending actual instructions to the aircraft flight control system or autopilot to actually make the indicated adjustments to the aircraft flight control surfaces. Existing aircraft autopilot systems perform this function today, automatically calculating airspeed and receiving AOA data (from instruments mounted on one or both sides of the fuselage), and adjusting either metric based on aircraft design features, specific flight characteristics, and the relevant flight conditions. However, autopilots have no corresponding display of the matched characteristics of AOA and airspeed to inform pilots of the conditions the autopilot is responding to, or to enable them to visually monitor the rate of adjustment and confirm that the autopilot is adjusting the metric in the preferred position to maintain flight control.

Figure 7:
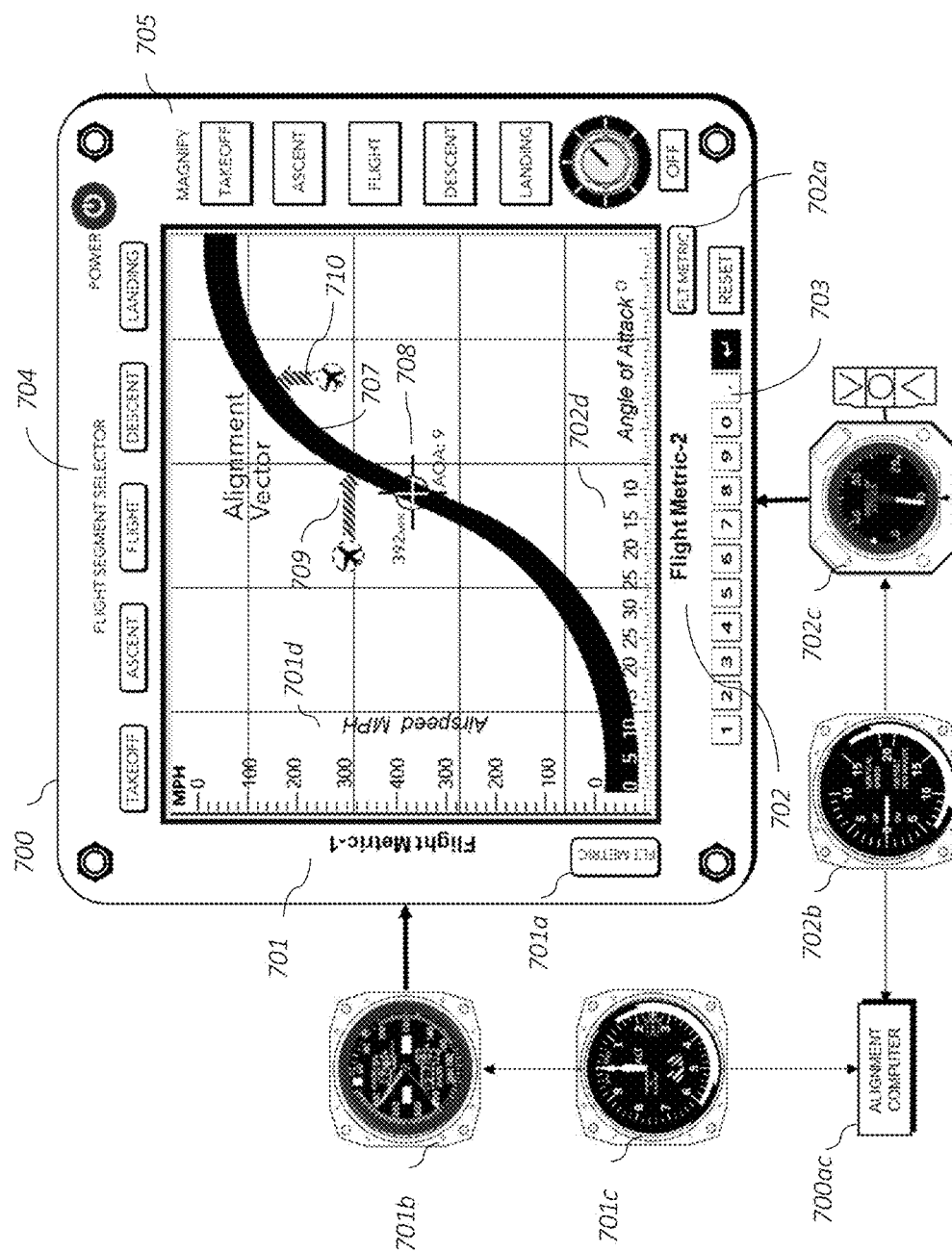
FIG. 7 shows an embodiment of a matched array aircraft flight alignment system display device for a target flight path as an aircraft moves through the five windows of takeoff, ascent, level flight, descent, and landing.

FIG. 7 shows an embodiment of matched array technology applied to representing the alignment of various flight metrics during the flight of an aircraft from takeoff to landing. The context is a flight alignment instrument display 700 representing the interaction of any two variables relevant to the subject flight, such as airspeed and angle of attack, or altitude and airspeed, etc. Such a use case provides value to the pilot and co-pilot by providing an intelligent visualization for quickly interpreting and assessing whether the combined selected settings for position, altitude, speed, and attitude (in an embodiment, and collectively, the "state") of the aircraft are within safe or target ranges. This is of special value, for example, during long trans-oceanic flights during which loss of contact with standard navigational beacons due to distance from land, combined with blindness to visual cues due to darkness, require extra diligence and continuous understanding of the aircraft's dynamic state at all times.

The following are exemplary components, features, and functionality of the flight alignment instrument 700 pursuant to design principles and engineering capabilities of general matched array technology:

a. Alignment computer. The alignment computer 700ac computes the target relationships between the selected metrics, generating the matched array and alignment vector corresponding to actual system performance. Upon selection of the metrics to be entered using switches 701a and 702a, or other input devices, and the system uploads the corresponding computed metrics and relationships. Data from the aircraft's flight navigation system can also be uploaded to the flight alignment system directly.

b. Flight metric 1. The aircraft will already be equipped with digital or electromechanical instruments for airspeed 701b and altitude 701c, for example, and the same signal feeds informing these instruments can be used to provide data feeds to the flight alignment instrument. The display screen scale 701d can show the actual scale of the metric or a proxy value such as 1, 2, 3, etc. Further, symbols or lights can be deployed to show progress along the instrument scale consistent with the progress of the flight. If actual metric data is shown the scale will increase and then decrease as it is read from bottom to top, in line with the increase in speed to level flight and decrease to descent and landing. Flight metric 1 data may be input using keyboard 703, or other input device, such as a touch screen interface or voice interface.

c. Flight metric 2. This axis captures the alternate metric the pilot may wish to coordinate with flight metric 1, and is selected using flight metric selector switch 702a. Shown by way of example are options for vertical air speed 702b and angle of attack 702c instruments, and the digital or electromechanical feeds to these instruments supply data to the flight alignment instrument as well. The metric scale for this axis of the array can also consist of actual or proxy values, or symbols for progress or the passage of time. Flight metric 2 data may be input using keyboard 703, or other input device.

d. Flight segments. Segments of the flight are selected so as to avoid discontinuities or reversions, resulting in a smooth contour suitable to use in composing the alignment vector. To achieve this, the flight may be divided into five windows 704: takeoff, ascent, flight, descent, and landing. Pressing the segment selector button causes the screen to display that segment across the entire screen. In addition, 705 provides variable magnification for each flight segment, with the degree to magnification controlled by a manual dial 1006.

e. Alignment vector. The flight alignment system instrument supports unambiguous interpretation of flight management parameters, and part of its utility is the ability to combine actual metrics and user-friendly forms to facilitate safe and intuitive flight. The alignment vector 707 is the product of both the alignment computer calculations and an intuitively-designed user interface that illustrates the overall contour of the flight (as reflected in the up, level, down stages) using an S-curve design. Alignment computer correlations between the selected flight metrics are mapped to this alignment vector 707, and the specific location of the current flight state is identified by an indicator shown as the crosshair marker 708. Indicators identify when the aircraft is not on the alignment vector. For example, the airplane-arrow icon 709 shows the aircraft flying at an angle of attack (relative to the x axis) that is too steep to remain on the alignment path, and identifies the direction in which flight changes can be made such that alignment can be attained. Similarly, airplane-arrow icon 710 indicates the airspeed is too slow to remain on the alignment vector, and the direction and amount of adjustment are reflected by the position and length of the arrow.

Figure 8:
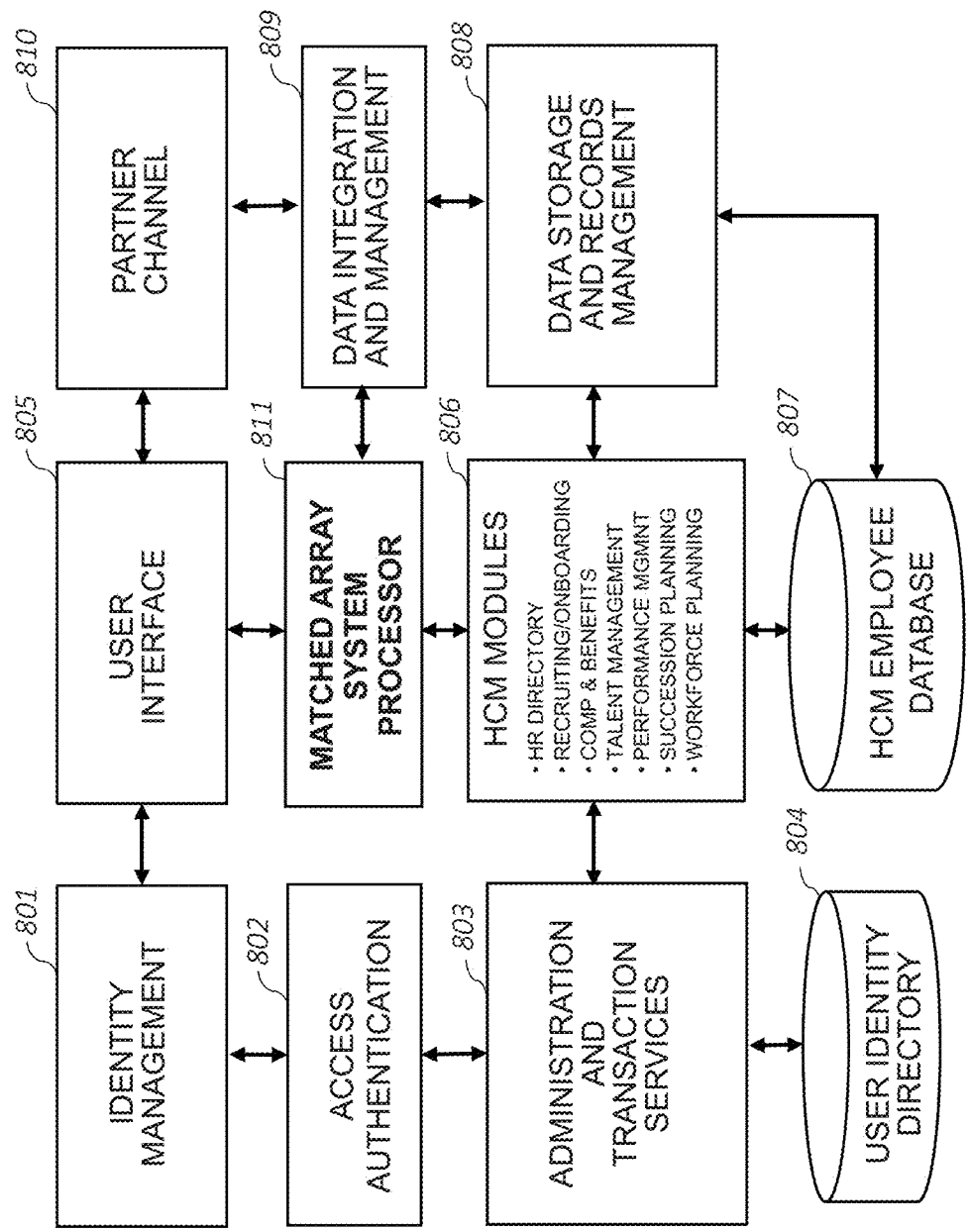
FIG. 8 shows an implementation of a matched array system in a human capital management system, according to an embodiment.

Next, FIG. 8 examines a business process case of the matched array technology applied to improving the function of a computerized human capital management (HCM) system. Human Capital Management systems are complex and powerful platforms for bringing together information about employees, ranging from administrative data such as timekeeping, pay and benefits to supporting recruitment, performance management, and workforce and succession planning. In this application, the matched array technology materially improves the HCM's performance management and workforce planning functions. Performance management is the function that helps organizations (i) set enterprise objectives; (ii) cascade those objectives down to business units, teams, and individual employees; and (iii) track individual and collective achievement of objectives. The allocation and cascading of objectives are straightforward activities. However, individual employee performance evaluation is more challenging as it depends on the skill of managers holding sometimes challenging one-on-one conversations with employees. Workforce planning is the function that helps project and strategize around the aggregate, long-term balance of the supply and demand for talent across the organization (e.g., skills, locations, volume, and level of employees).

FIG. 8 is a simplified representation of a human capital management system (HCM). HCM system components 801, 802, and 803 (e.g., one or more computing devices such as that shown in FIG. 17) manage the engagement and authentication of users and the administration of their transactions, accessing directory data from the user identity directory 804. The user interface 805 enables users to access system functionality embodied in a set of HCM modules contained in core HCM component 806 and providing functionality such as recruiting and onboarding, compensation and benefits, succession planning and performance management. These modules access, manipulate, and update data in the HCM employee database 807. The modules are continually generating updated data from employee information and changes, and the records management system 808 tracks and updates these continually. Data and integration management system component 809 continually integrates and manages data across all the components. Most HCM systems also include a partner channel integration component 810 that connects and integrates applicable third-party systems, for example through an application programming interface, such as xAPI. These third-party partners include, for example, providers of assessment tools, training modules, and employee financial management tools for savings and retirement planning.

A matched array system processor 811 (which can be implemented as a separate hardware processor such as a controller or microprocessor, or as a computing device such as that shown in FIG. 17) is accessible to users, and connects with the underlying HCM modules for data extracts and updates to support its operations. Note that the partner channel 810 could be used in an embodiment of the technology to connect an HCM system to an external, partner-provided matched array technology system, enabling connectivity and integration to deliver the same functionality as the internally configured embodiment of the matched array system.

The performance management function in HCM systems typically addresses measurable employee goals such as sales targets, cost reduction goals, and completed projects that are classified as indicators of "performance." The more qualitative and behavioral objectives relevant to career advancement (such as leadership, teamwork, culture, and assertiveness) are deemed indicative of "potential." Performance is seen as more directly under the control of the employee, while potential is subject to the interpretation and control of management (given the larger context of the organization, its dynamics, and the manager's understanding of its leadership needs). Matched array technology will be described as applied to two use cases: the facilitation of individual manager-employee performance evaluation (performance management use case), and business-unit-wide evaluation of overall talent distribution and density (workforce planning use case).

The business problem in performance evaluation concerns the widely-perceived inadequacy of many frontline managers in providing meaningful, consistent, and actionable performance feedback to their direct reports. Performance in most organizations is measured in terms of the extent to which the employee "meets expectations" of the manager. Industry research notes that managers would be supported greatly by tools that provide more specific performance feedback and more meaningful and actionable advancement coaching. Matched array technology improves HCM system support of these needs by visually identifying the extent of alignment between management and employee expectations on a two-dimensional array, plotting the employee's position, and charting the direction and extent of improvement needed to approach alignment with management expectations. This alignment (meets expectations) condition reflects a performance management state in which manager and employee state are equivalent (that is, the employee is meeting manager expectations). Accordingly, proximity to the alignment vector in an embodiment can effectively communicate the degree of manager-employee alignment, and the direction and extent of change needed to close any gaps.

An additional value of matched array technology lies in addressing the talent "calibration" challenge. Differences in how individual managers evaluate their employees (e.g., more of less strictly) leads to different ratings for equivalent talent, or different ratings for the same talent when evaluated by different managers. These distinctions raise significant issues impacting compensation recommendations, assignments, and even promotions, based on possibly specious differences in assessments of an employee's capabilities, performance, and potential.

Figure 9:
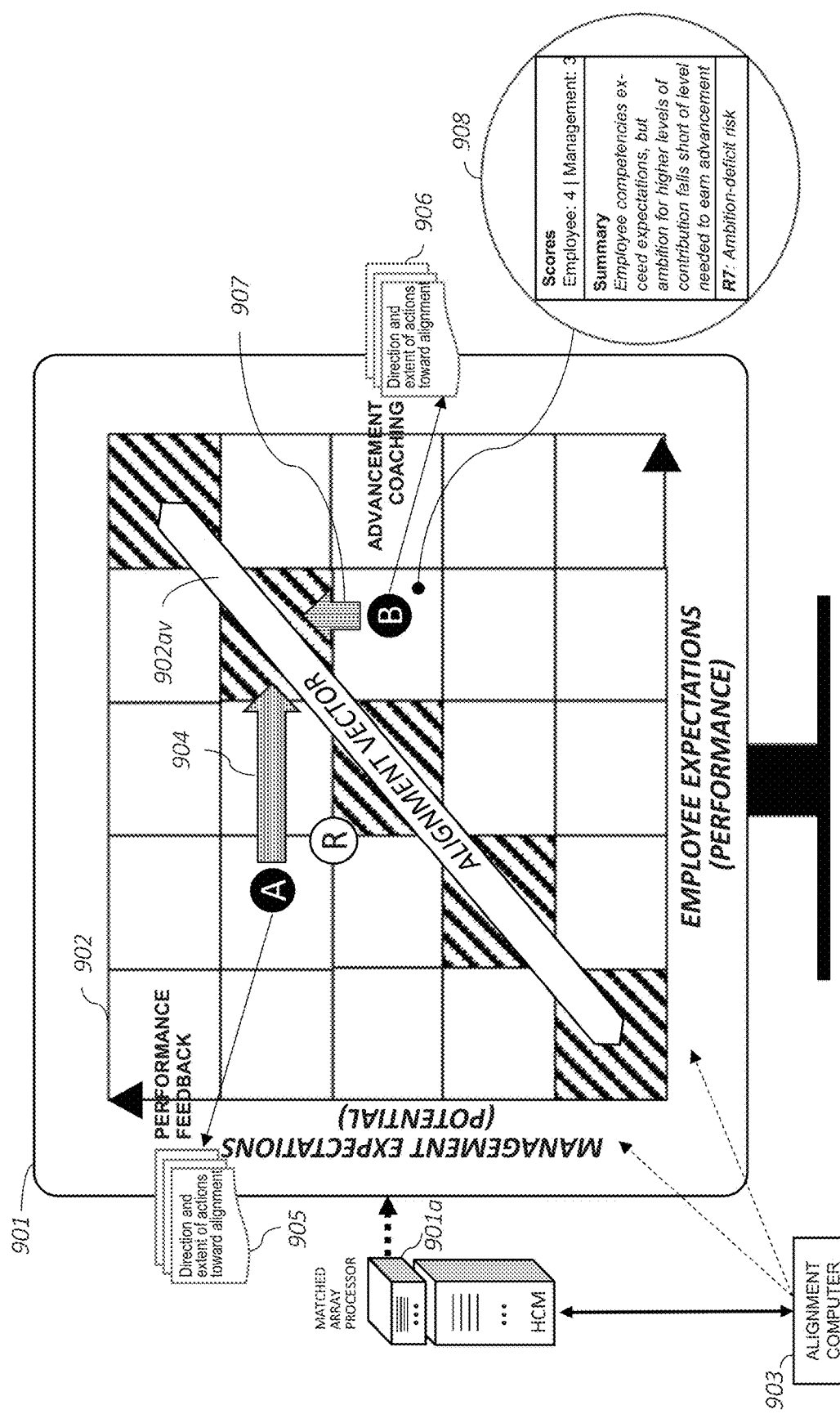
FIG. 9 shows output (on a display device) of a matched array system resulting from a human capital performance evaluation for two illustrative employees, according to an embodiment.

Supporting this use case, FIG. 9 portrays an embodiment of the matched array display technology applied to enhancing performance management functionality in an HCM system implementation. A computer monitor 901 displays output from the matched-array-enhanced HCM system 901*a* (e.g., a computing device such as that shown in FIG. 17), and the matched array display 902 is shown with its associated alignment vector 902*av* ranging along the center diagonal. Distinct X and Y axes are defined specifically through the alignment computer process 903 similar to that outlined in FIG. 3 to reflect matched terms for employee and management expectations, so the resulting alignment vector represents the points at which employee and management performance and potential expectations are aligned. In this embodiment, the correspondence between the values represented by the axes may also be presented as specific corresponding terms. For example, a management expectation of "develop" might be matched with an employee expectation of "advancement."

Information for HCM use cases can be gathered in different ways. Performance appraisal evaluations can be used to gather the information needed to inform the plotted positions. Other observations can for the inputs, and the use of surveys, artificial intelligence, or graphing methods can be applied to the scaling of these inputs for use in creating the matched array. Similarly, a survey can be administered specifically to identify the employee position on the matched array using quantitative indicators that enable plotting in graduated increments that have greater precision than simple box placement indicators (e.g., a calibrated survey might show a position as (x=2.4, y=3.5). Managers armed with these statistics, with evidence for their assessments, and with ideas for improvement, can have clearer and more specific conversations about the reasons supporting the present position assessment, and the proposed direction and extent of improvement desired. These discussions can also result in more finely-tuned and mutually-acceptable compromises in performance appraisals that adjust plotted metrics numerically (e.g., x=2.7, y=3.5), an approach that may be preferred to changing a word in an appraisal that has a specific and important meaning in an organization's human capital management practice.

Specifically, in FIG. 9, two employees are plotted at A and B. Employee-specific identifying and classifying data information for each employee can be accessed in an embodiment by clicking on A or B on the matched array. The matched array (generated and maintained, for example, by a computing device such as that shown in FIG. 17) shows employee A has above-expectation potential (plotted above the expectations alignment vector 902*av*), while A's performance is below expectations (to the left of expectations alignment vector 902*av*). Accordingly, the associated direction and extent of improvement actions lean toward improving performance by moving employee A to the right along improvement path 904 toward the expectations alignment vector. The relative distance from the alignment vector provides a visual indicator of the degree of improvement needed, based on the axis definitions applied. A manager would review the details and evidence driving the plotted position, and potentially create a playbook 905 that includes actions appropriate for employee A's improvement. This playbook discussion could include changed behaviors, new assignments, specific commitments, training, and exposure to skill-enhancing experiences. The matched array also enables the addition of reference points such as historical markers showing employee prior plotted positions, or organization averages R based on groups of comparable employees in position for similar lengths of time. Accordingly, the employee's performance and potential can be guided by reference to her past plotted positions as well as in reference to the average of a reference set of employees.

Matched array display 902 also shows an employee B has above-expectation performance (to the right of the expectations alignment vector 902*av*), but below-expected potential (below the expectations alignment vector 902*av*). A manager would review the details and evidence driving this plotted position, and potentially create a playbook 906 that includes actions appropriate for employee B's improvement along a path 907. Here, guidance will be oriented toward improving aspects of potential, driving toward expectations alignment with vector 902*av*, while maintaining the existing level of performance. The shorter length of the improvement path 907 in the matched array display also indicates that the improvement in potential required of employee B is relatively modest compared to the extent of performance improvement expected of employee A. However, time and effort required to improve are employee- and path-specific.

Matched array technology and associated alignment vector optimization can use simple direct input of managers about their employees, or other established criteria. The visual presentation provides an enhanced platform for communication with the employee about the specifics of both performance and potential. By defining the alignment vector as the position at which manager and employee expectations are aligned ("meets expectations")—matched array technology provides a basis for defining expectations clearly, identifying variances to this objective position, and underscoring employee behaviors and measuring results in terms of position relative to the alignment vector. Given that current HCM systems only support and capture narrative descriptions of performance, intelligently visualizing the direction and distance-indicated extent of improvement needed to align expectations marks a significant and tangible enhancement of the technological capabilities of current human capital management systems.

Further to the performance management use case, an alternate embodiment of the matched array technology can assign specific characteristics to each cell of the matched array matrix 902, based on the interpretations inherent in the meaning of the axes. For example, supplementary display panel 808 shows a display of the status indicators for performance, potential, and risk associated with the employee position (generally indicated by the employee-position distance from the alignment vector 802av, and whether it is above, below, or to the right or left). In a given embodiment, this information can be accessed by clicking on the displayed cell, thus revealing the underlying content. In these and similar embodiments, axis definitions, combined with descriptions of each cell can inform the manager and employee of the current status of performance and potential, as well as the nature and extent of change needed.

Matched array technology provides a useful level of generality for assessing performance and potential that makes it applicable to a broad range of employment situations based solely on the axis definitions. And the alignment vector always represents the points at which management and employee expectations are aligned, and the cells will always have definitions that align with how the axes are defined. As a result, and since in all the embodiments, the evaluation of the plotted position is always in reference to the alignment vector, the matched array and the definition of all the content of its cells will be equally applicable in every employee-manager situation in which the axis definitions remain relevant. For example, the definition of "meets expectations" is always interpreted as alignment on the vector 902av, and will have different content, but the same implications, for a research scientist as for a financial analyst. The relevant distance and direction for similarly plotted positions will represent the same general degree and direction of improvement needed.

Figure 10:
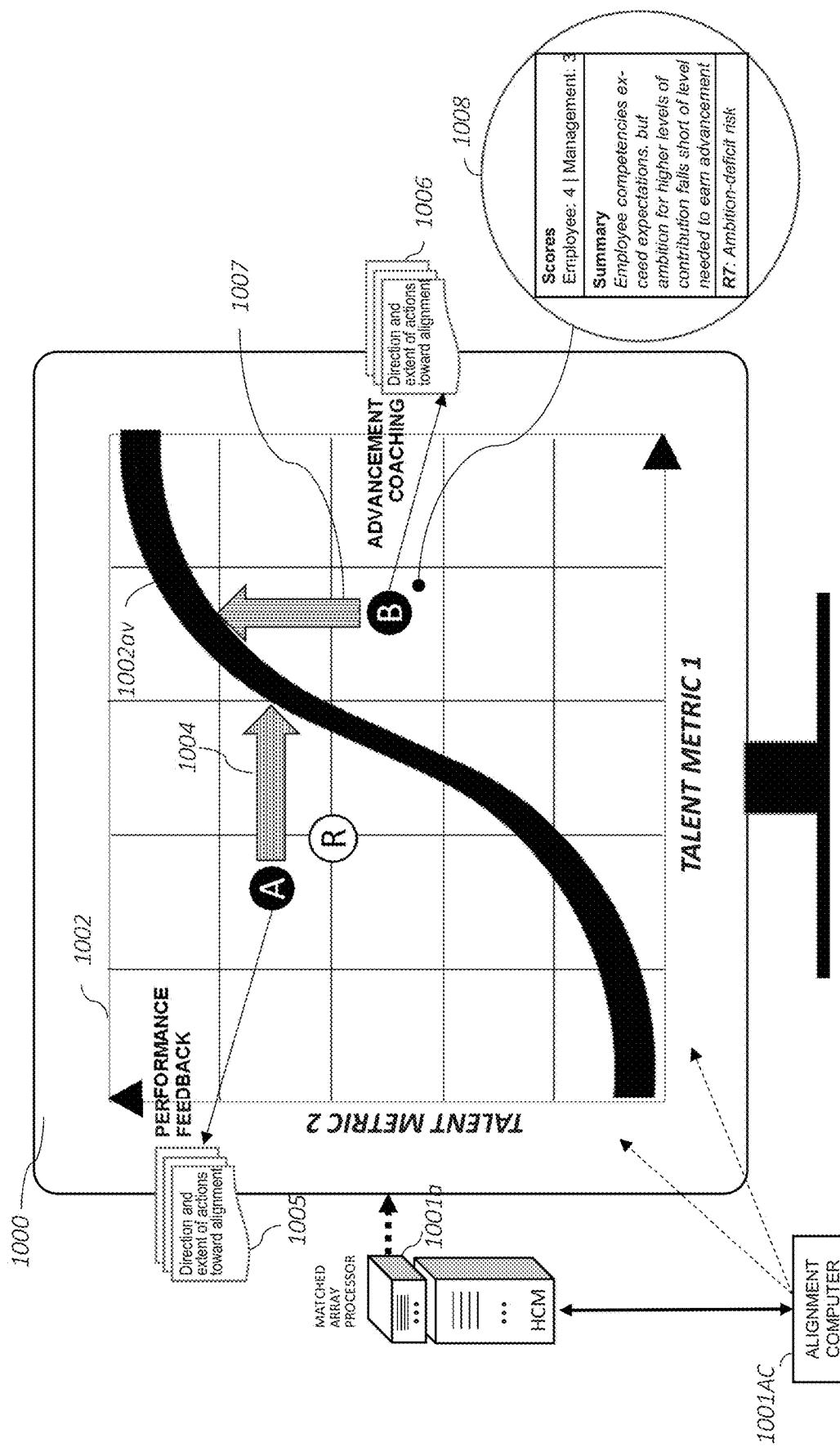
FIG. 10 shows an output on a display device in a use case for a matched array system configured according to an embodiment in which a general alignment vector portrays the flexible representation of target ranges of variable values, and two illustrative employees are depicted in this context.

FIG. 10 shows an output on a display device 1000 in a use case for a matched array system 1002 configured according to an embodiment in which a general alignment vector 1002av portrays the flexible representation of target ranges of variable values, and two illustrative employees A and B are depicted in this context. Here, the lower contour of the general alignment vector 1002av emphasizes performance more so than potential in the early stage of an employee's job tenure or career, as demonstrated by the rightward curvature along the talent metric 1 axis. Later in job tenure (or career progression) a greater emphasis is placed on potential in the upper portion of the S-curve when the rise (vertical distance) in the curve exceeds the "run" or horizontal travel. For example, in professional services, early stage work consists of more technical and detail-oriented effort, while later-stage work reflects more business-generating (potential-driven) client management, selling, and leading specific client efforts to build business. Further on, at the top of the curve, the S-curve bends to the right—later in the job or career stages of the employee—when expectations might turn more toward writing articles, contributing to practice development, and other endeavors for which leadership and business-building potential are less important, and more tactical contributions are made.

Continuing with FIG. 10, employees A and B are plotted in positions similar to those plotted in the prior drawing, and the implications and insights are the same with the arrows 1004 and 1007 showing the direction and extent of change needed to achieve alignment, but now plotted against a general alignment vector 1002ay. The playbooks for performance feedback 1005 and advancement coaching 1006, as well as the matched array cell data content 1008 all have the same meaning as their equivalents in FIG. 9.

Figure 11:
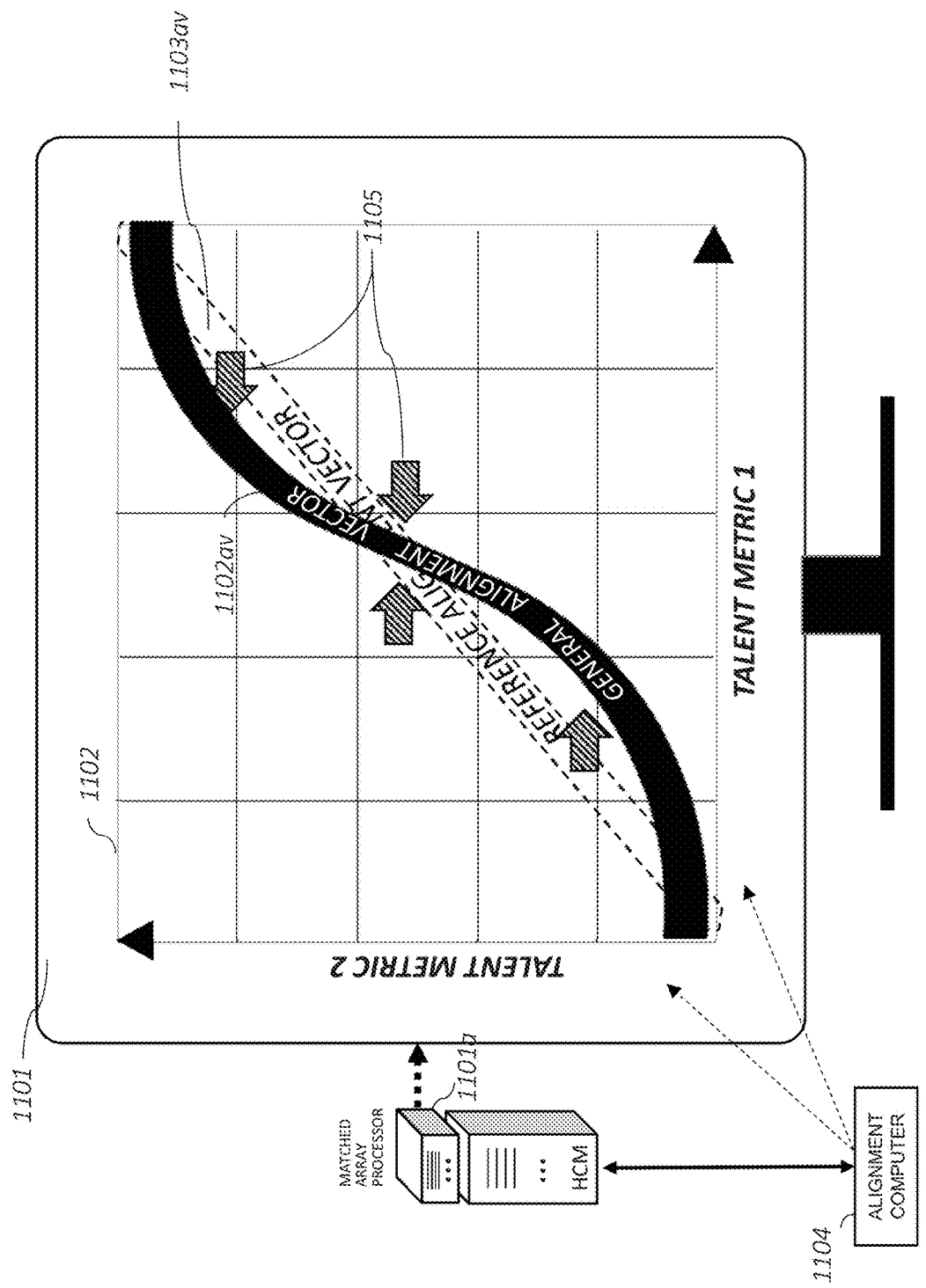
FIG. 11 shows an output on a display device in a use case for a matched array system configured according to an embodiment in which a general alignment vector is defined in relation to its contour in comparison to a reference alignment vector.

FIG. 11 illustrates a general alignment vector specified in relation to the reference alignment vector 1103av on a display device 1101 in a use case for matched array 1102 configured according to an embodiment. The source of data is the HCM system matched array processor 1101a. The alignment computer 1104 can configure any relevant axis definitions, ensuring that the proxy values of Talent Metrics 1 and 2 correspond with fidelity to the underlying operational relationships. The illustrative S-curve-shaped general alignment vector 1102av can be defined, shaped, and specified quite specifically in relation to the diagonal alignment vector 1103av, by evaluating measures of deviation and proximity 1105 in relation to the reference alignment vector 1103ay.

Figure 12:
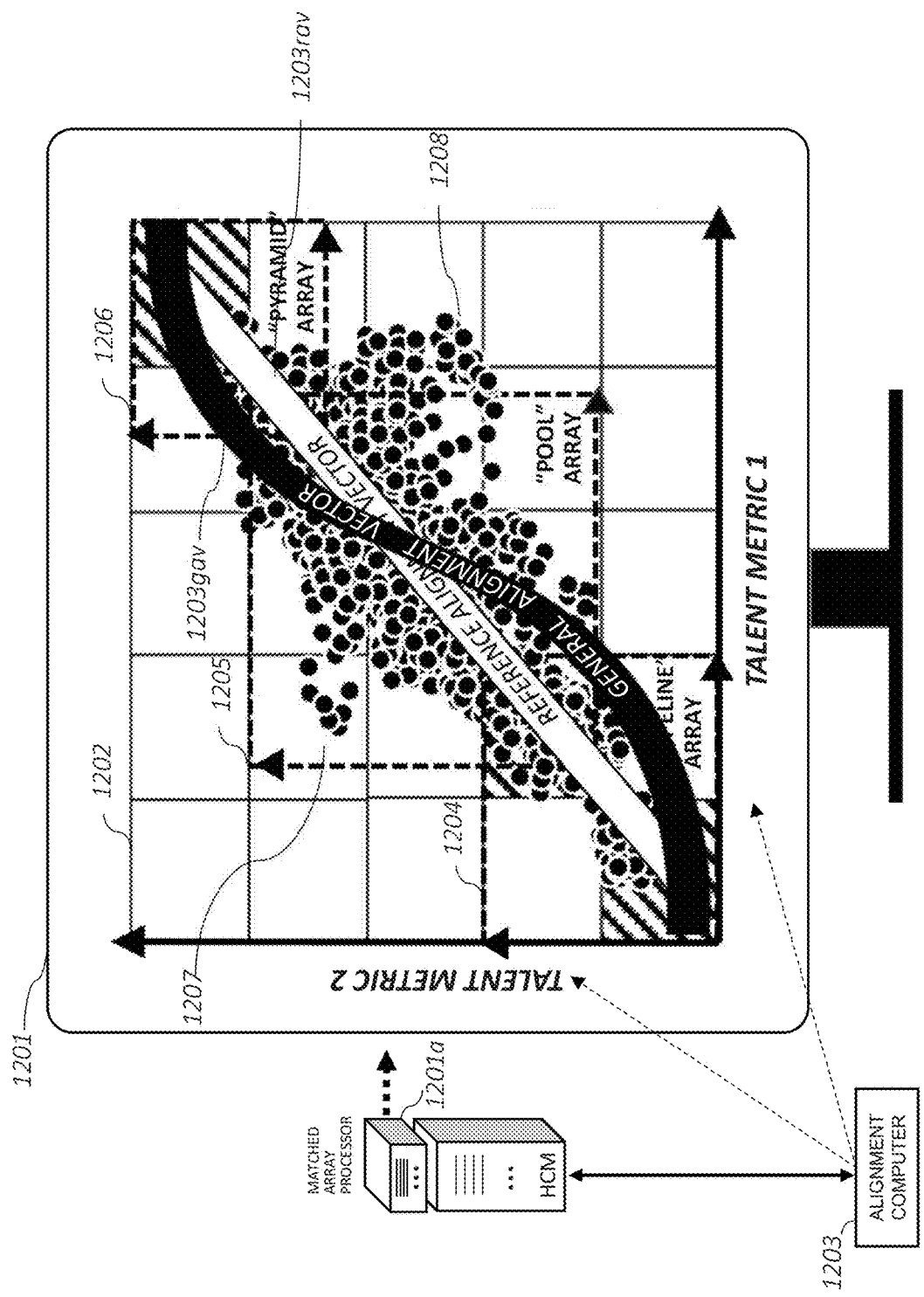
FIG. 12 shows an output on a display device in a use case for a matched array system configured according to an embodiment applied to an aggregation of employees in a human capital management system implementation, resulting in a display of the talent architecture of the organization.

FIG. 12 shows an embodiment in which matched array technology can be applied to workforce planning in an overall enterprise or organization unit. This is accomplished by compiling individual employee plots (represented by the dots on the display) into a scaled overall display, along with use of the appropriately adjusted axis definitions via alignment computer application (e.g., software executing on a computing device such as that shown in FIG. 17) at 903. Once the scaled axes are established and calibrated to the organization being assessed, the scales can be used for a range of organizations, time periods, or other settings (e.g., different functions, such as finance or marketing). Monitor 1201 displays information from a matched-array-enhanced HCM system 1201a. Employees are plotted directly onto a shared matched array display 1202, or can be grouped into categories reflecting their relative tenure or contribution. In the embodiment shown, the matched array is composed of three such groupings of employees: entry-level talent in "pipeline array" 1204, mature and stable talent in the "pool array" 1205, and high-potential leadership or growth talent in the "pyramid array" 1206.

Displaying talent together in a matched array scaled to represent such an aggregation provides an overall portrait of the organization's "talent architecture," defined as the pattern and alignment of talent in response to workforce policies, processes, and practices. This talent architecture view enabled by matched array technology can show rich and novel detail, such as the current density and distribution of talent, visual perspectives on the adequacy of recruiting efforts in pipeline array 1204, and the availability of leadership talent in the pyramid array 1206. In the center lies the bulk of the organization's talent at pool array 1205, which can be analyzed for turnover, inbound replacements, feeding of talent to advancement opportunities, and overall quality (based on proximity to the alignment vector).

Moreover, talent architecture represented on the matched array can detail the relative dispersion of the talent around the alignment vector providing an indication of relative talent quality and measures of risk. For example, although a stable core of employees would ordinarily populate the pool array, the small group of employees at plotted group 1207 is falling significantly short of performance expectations and poses a termination risk if their performance cannot be rapidly and substantially improved. By contrast, employees at plotted group 1208 reflect a group of outstanding performers who pose a retention risk, as management—despite their performance—has not rated them as having sufficient potential for advancement; they may easily be lost to other employers. Finally, over time, the matched array and alignment vector technologies provide a way of tracking and measuring the organization's leadership "yield." Leadership yield is the rate and volume at which talent traverses from pipeline to pool to pyramid, reflecting the organization's capacity to produce, grow, and retain the leaders it needs to run the organization. None of this information is provided in typical HCM systems.

While modem HCM system workforce planning functionality addresses planning for the type and volume of skills the organization will need by role, organization, and location, matched array technology provides a view of the overall architecture dynamics (distribution, density, risks, and yield) of talent that adds richness, clarity, and enhanced diagnostic insight into these dynamics by providing a visual and composite display. Customary, high-technology HCM-based workforce planning cannot begin to approach this level of depth and insight. The most closely-related HCM practice, "organization design," requires a costly analysis and research effort (studying each employee's evaluation rating) to generate the insights that are immediately accessible through this talent architecture view. Matched array and alignment vector technologies give leaders a better-informed and more easily understood perspective on the entire landscape of talent at a glance, in contrast to pouring over reams of workforce planning data and individual employee performance evaluations.

In an embodiment, a first set of inputs into the system of FIG. 12 is received from a first client computing device (entered via a user interface of the first client computing device) and a second set of inputs into the system of FIG. 12 is received from a second client computing device (entered via a user interface of the first client computing device).

Figure 13:
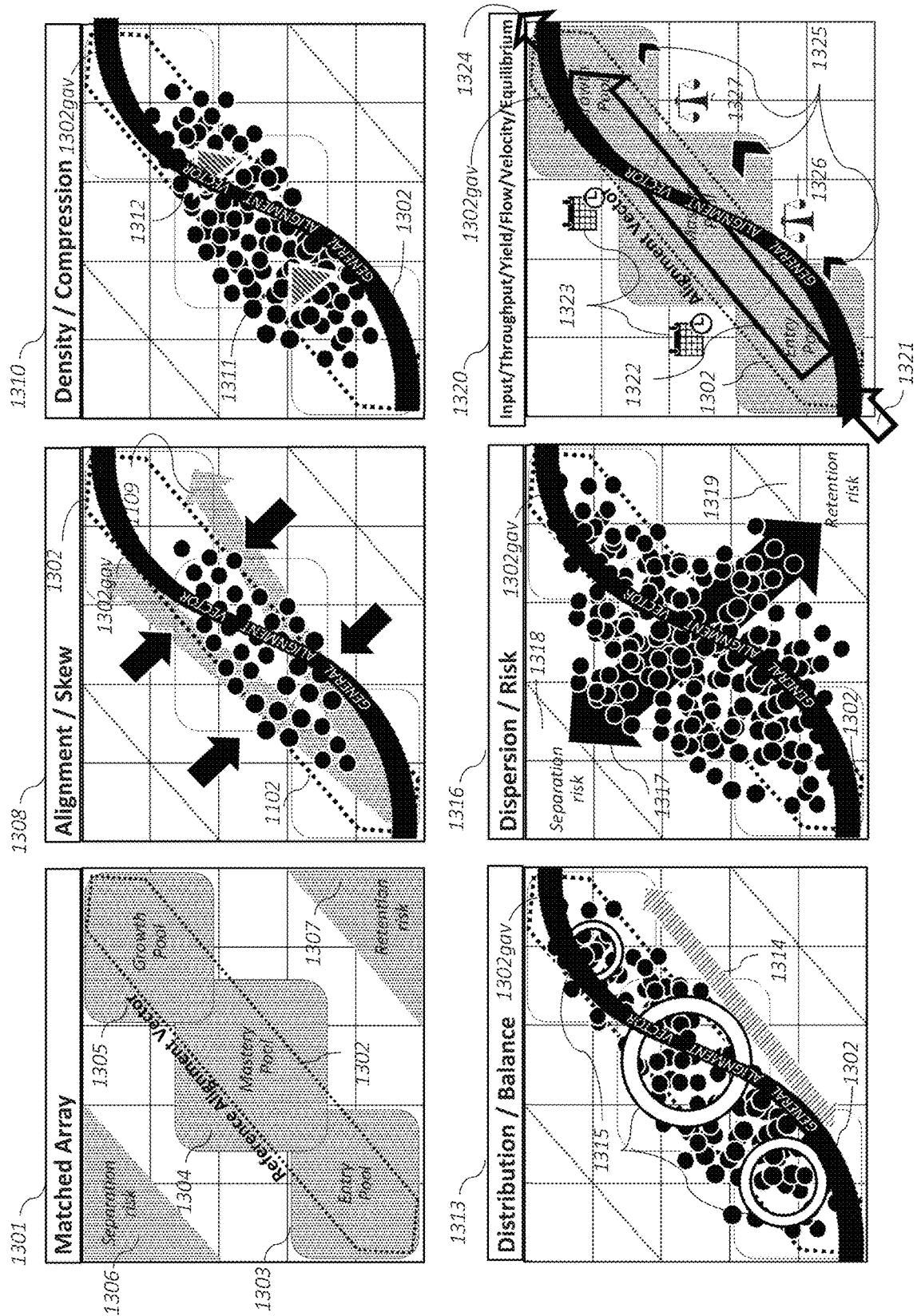
FIG. 13 illustrates the matched array talent architecture in a series of six panels showing the overall array elements, four panels demonstrating the static metrics associated with specifying and measuring talent architectures, and a final panel representing the dynamic metrics embodied in the talent architecture; all with both reference and general alignment vectors.

Turning to FIG. 13, a set of six panels illustrates the static and dynamic metrics used to characterize the features of a talent architecture according to an embodiment.

a. Panel 1301 portrays the matched array, showing its core geometry, including X and Y axes for employee performance and potential, respectively, the alignment vector center diagonal approximating the area around the points at which values of x equal values of y, signaling alignment between management and employee. Along the alignment vector, broad areas are highlighted indicating the three representative stages of progress through a given job: entry stage 1303, mastery stage 1304, and growth stage 1305. Finally, the northwest area 1306 and southeast area 1307 of the landscape—the areas furthest from the alignment vector—indicate the areas of highest risk: risk of separation 1306 due to poor performance, and retention risk of losing talented staff 1307 to opportunities outside the organization. These elements form the backdrop against which all metrics are defined in subsequent panels;

b. Panel 1308 shows a scatter plot of individual employees populating the matched array, resulting from survey data or other data collection methods. Alignment measures the degree to which the scatter plot is tightly grouped around the diagonal vector 1302. Given the direction of talent success toward the northeast quadrant of the matched array, the scatter plot generally has a similar directional tendency. Arrows 1309 measure the extent to which the employee scatter plot leans above or below the vector, representing the skew of the architecture, its general tendency to favor high-performers (downward skew) or high-potentials (upward skew). Talent plotted approximately along the alignment vector shows a balanced mix of potential and performance, which is ideal for talent growth and for business performance;

c. Panel 1310 shows a well-aligned talent architecture with a significantly greater number of employees with similar profiles than shown in panel 1308, indicating a higher density in roughly the same distribution. Triangles located at 1311 and 1312 designate areas of "compression," where movement from entry to mastery, and from mastery to growth may encounter blockage—a condition in which the capacity to supply talent to the next higher progression exceeds the capacity to absorb that talent into the next level. As a result, "bunching" of the scatter plot—compression—can occur;

d. Panel 1313 illustrates talent architecture distribution and balance. Distribution measures the spread 1314 of the scatter plot along the natural alignment vector path of growth 1302. Balance reflects the relative density of employees in each of the stages of entry, mastery, and growth areas of the matched array, which is important to managing the hiring, preparation, flow, and equilibrium of talent as the organization grows;

e. Panel 1316 identifies the relative dispersion of talent away from the alignment vector 1302, which is a measure of talent risk. High dispersion generally reflects one or both of two conditions: When dispersion takes the form of scatter plots extending to the upper left of the matched array, this generally represents talent falling short of performance standards, as represented by the relatively long distance above and to the left of the alignment vector, potentially resulting in separation. Alternatively, when dispersion takes the form of scatter plots extending to the lower right of the matched array, this tends to reflect limited opportunities for growth, or poor follow-through in enabling advancement, resulting in retention risks, the potential loss of performing talent to opportunities outside the organization. Dispersion can be measured at various points along the alignment vector, and represented in a statistical formula similar to that used to define, for example, a linear regression fit;

f. Panel 1320 shows an assortment of dynamic metrics that capture talent architecture change over time as employee presence, performance, potential, and growth change over time. Specifically:
  i. Talent coming into the system are inputs 1321 (either outside hires or internal transfers in) measured in terms of volume, reflecting recruiting practices, hiring intensity, and (implicitly) the hiring standards, employment value proposition, and specific search criteria applied to finding and attracting;
  ii. With development and growth over time, the ideal employee trajectory 1322 shows passage through the entry, mastery, and growth stages of job experience. Ideal in this sense does not necessarily mean directly paralleling the alignment vector 1302, although it may. Some organizations seeking to expose talent to different experiences might intentionally drive talent to more intense performance- or potential-emphasizing development while trending in the direction of the alignment vector from entry to mastery to growth. Accordingly, this path is a function of organization experience, preference, and practice, and need not be linear;
  iii. The timing for a given employee to make the transition from entry to growth is measured throughout, but timing is especially critical at transition point 1322 from entry to mastery, and transition point 1323 from mastery to growth. Further, the availability of upward opportunities, the organization's ability to plan for talent growth, and the capacity to prepare capable talent for greater responsibility all contribute to the organization's ability to manage these talent transitions;

iv. An employee who has successfully made all the identified transitions will emerge at the end of growth as a leader available for higher-level assignments in the organization at 1324 which represents advancement beyond the current organizational unit. The progression of talent from input 1321, along trajectory 1322 to emergence at 1324 is a measure of the leadership yield of the talent architecture, and the number of employees undergoing that progression over a period of time is a measure of the throughput of the talent architecture. Leadership yield results from a combination of factors, including inputs of new talent, talent losses along the way, and successful talent development;

v. The chevrons 1325 represent the number of employees progressing from stage to stage, resulting in the volume of employees in each talent pool (entry, mastery, growth) available to support the needs of the organization. Part of that migration is stochastic, but a portion can also be planned, projected, and managed to achieve a range of organization objectives, such as generating certain leadership yield, or establishing equilibrium in the supply of talent from one stage to the next as at transition points 1326 and 1327, all to match the leadership talent needs of the organization;

vi. Finally, the overall talent architecture can be viewed as a dynamic production function taking in, applying, and developing talent for the organization's needs. This generates additional metrics, including the overall flow of talent through the system, including where that flow speeds up or slows down and why, and the velocity of talent movement, reflecting the speed and direction with which talent progresses through the organization. These concepts also enable measurement of concepts such as voluntary and involuntary attrition, as well as process friction in the throughput of talent from entry to mastery, and to growth, helping to characterize the employees' experience along the trajectory 1322.

These static and dynamic metrics enabled by the talent architecture have at least four types of utility not accessible through traditional approaches to organization design, workforce planning, or performance management:

a. First, they describe the structure of the talent architecture, providing a richer and more complete vocabulary for description than an organization chart or succession plan, including the performance and potential of the talent in the roles represented (in contrast to the jobs represented by boxes on an organization chart);

b. Second, they enable diagnostic insights into the nature, type, and impact of chokepoints, development needs, and structural characteristics of the organization;

c. Third, the dynamic attributes of the talent architecture (input, flow, throughput, yield, velocity, and equilibrium) provide a way of evaluating the efficiency and performance of the organization as a system for taking in, deploying, and developing leadership talent. Such an understanding can facilitate adjustment and management action to improve leadership development, increase the volume or speed of talent growth, and implement other talent management changes to achieve specific objectives.

d. Finally, tying the dynamic performance of the talent architecture to the existing structural features reflected in the static metrics enables managers to deliberately redesign the talent architecture in ways that can optimize organization performance, and then to manage to that objective through deliberate policies, practices, and actions. For example, addressing selection issues can improve the quality of talent inputs; focusing training provided to employees nearing compression zones between transition stages can accelerate passage through the trajectory; balancing flow from one stage to another can improve talent equilibrium across the pools; raising performance standards can drive closer alignment of talent to the trajectory 1322, intentionally elevating potentially overlooked talent in the mastery pool can increase leadership yield of the talent architecture as a whole.

Figure 14:
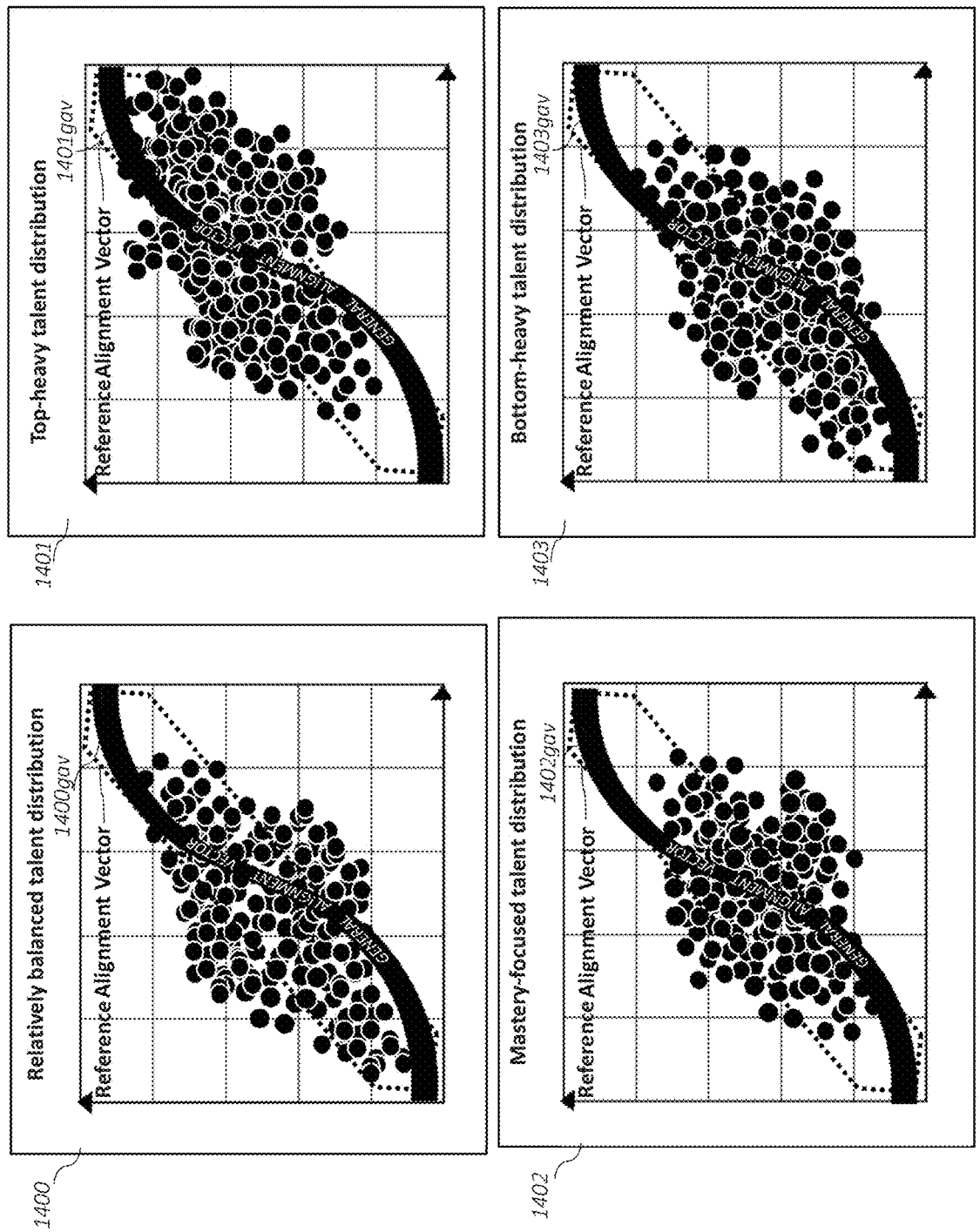
FIG. 14 illustrates four talent architectures that represent different architectural forms, reflecting a range of organizations and their talent patterns, all in relation to the central and general alignment vectors of each matched array.

FIG. 14 shows four different talent architectures illustrating a sampling of the configurations which may be encountered in practice. Each talent architecture reflects a roughly comparable level of talent quality, as evidenced by the relative proximity of the scatter plot of employees to the alignment vector for all stages of progression (entry, mastery, and growth). The core difference across the four talent architectures is in the location of the central mass of the talent along the alignment vector. Note that each of the architectures can be described in sufficient detail by its static metrics (alignment, density, distribution, balance, dispersion) to support unique identification and feature characterization.

Importantly, the different architectures also profile the underlying talent needs of the organizations they represent:

a. Talent architecture 1400 is an example architecture of a growing public accounting practice with most of its talent centered in accounting staff handling bookkeeping and audits for clients, as represented by the concentration of staff in the middle mass, but with active entry-level activity as well. There is a relatively large ratio of mid-level staff to higher-level personnel, and moderate talent input at the entry stage, reflecting apprentice-type professional development practiced in some mid-size accounting firms;

b. Talent architecture 1401 is representative of a relatively static, mid-size research organization with a preponderance of high potential and high-performance talent at middle and upper levels of a technical hierarchy. Evident density, dispersion, and professional growth challenges the architecture suggests are present should be assessed relative to career path and compensation for highly-educated staff, and the degree to which the work itself is the principal employment value proposition;

c. Talent architecture 1402 is representative of a moderate-growth architectural practice with a preponderance of staff architects and designers in the mastery stage, and a relatively flat hierarchy of leaders who still design and stay close to the work. New employees hired are relatively experienced or specialized in certain skills not generally represented in the central body of the talent; experienced model makers or CAD designers for example. The volume of talent below the alignment vector and populating the lower right area suggests that this firm may also fail to retain high-performing talent, instead accepting that it will not have sufficient growth opportunities for all of them, and consequently will lose a portion to other firms;

d. Talent architecture 1403 illustrates a fast-growing technology company with a significant inflow of developers at the lower end, and bunching in project teams in the middle. The organization is relatively flat (few team members in advanced roles at the upper end of the vector), and growth in the company leans in the direction of high-performance talent with density in and below the mastery zone below the alignment vector, possibly project team leads and specialized technical designers.

In addition to being descriptive, insights provided by the talent architecture can also shed light on ways to optimize organization performance. In every case, tightening the spread of talent around the alignment vector will bring talent into line on quality and progress. Addressing density issues that also emerge in the context of compression, opportunity, and talent policies (e.g., eliminating minimum time in position standards in favor of performance and potential) can also lead to improved satisfaction, positioning of the right talent for growth, and gaining alignment on progress. Importantly, management policies and actions such as these, are what change the shape and structure of the talent architecture.

Figure 15:
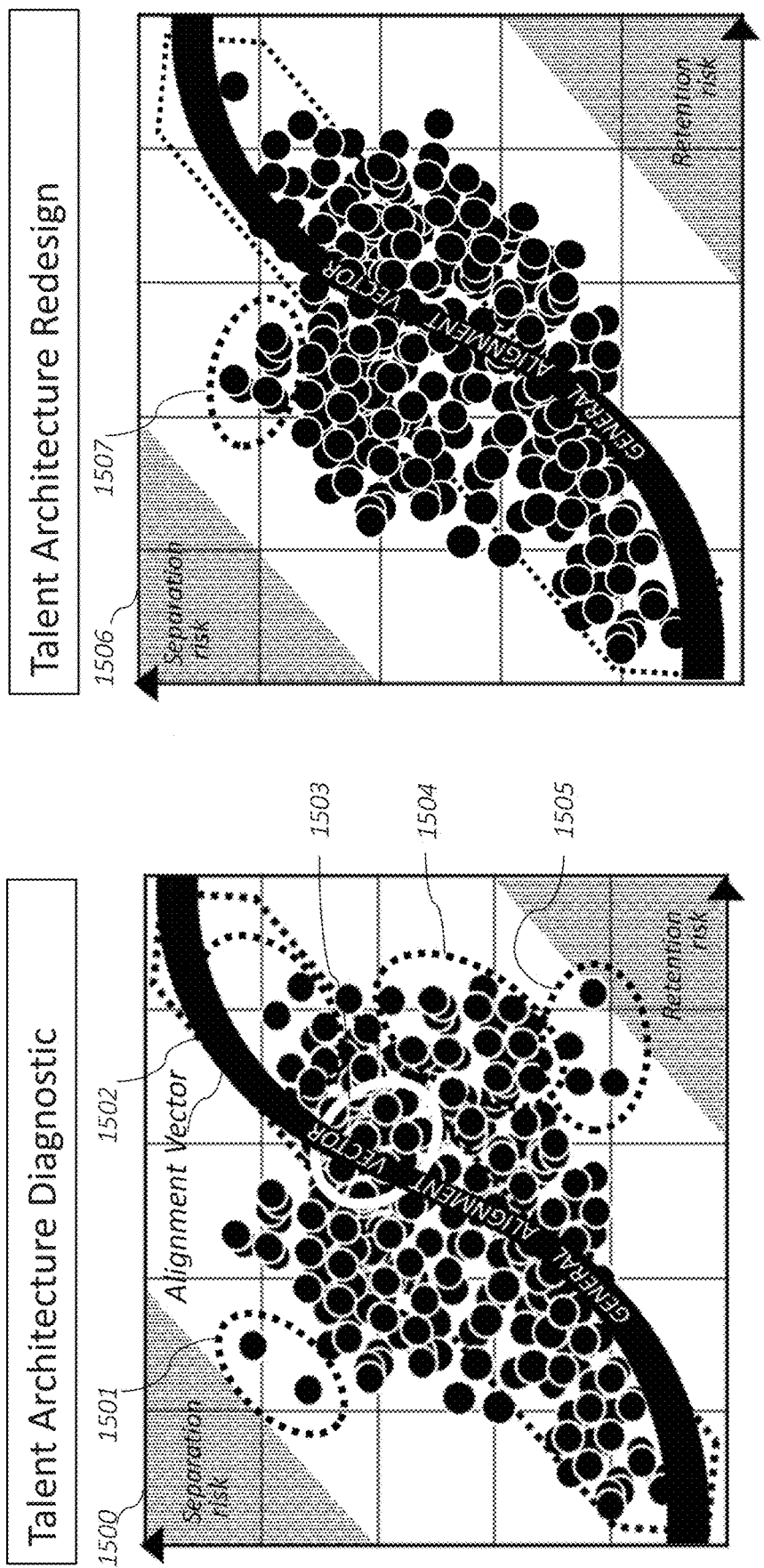
FIG. 15 illustrates of two panels, with the first showing the talent architecture used as a diagnostic revealing specific talent issues needing management action, and the second panel showing the changes having been made resulting in a redesigned talent architecture.

FIG. 15 illustrates an example the application of talent architecture technology to the diagnosing of organization issues, and the subsequent redesign of talent architectures in response. Specifically, in this example, after a critical diagnostic review resulting in designation of areas for improvement in the oval circles, five specific issues and their resolutions are identified:

a. Performance quality issues at 1501, are indicated by the proximity of two employees to separation risk area. Following a review and interviews, the resolution is to in fact separate these individuals, resulting in the release of employees with relatively high potential (above the alignment vector), but falling significantly short on expected performance (located relatively far to the left of the alignment vector);

b. Leadership growth issues at 1502 reflect a relative paucity of talent being prepared for growth. To address this, the two employees in 1502 will be advanced, along with three below them in the architecture who are solidly on the alignment vector;

c. The white circle at 1503 reflects a significant compression concern with high-mastery talent straining for growth opportunities. The compression has been relieved to some extent by the elevation of talent from 1502, but the high density in 1503 suggests further action will be beneficial;

d. Issues in 1504 concern a relatively large number of high-performance employees (to the right of the alignment vector) whose retention is not immediately at risk, but whose growth prospects and commitment should be addressed to forestall retention issue going forward;

e. Four employees at 1505 are immediate retention risks. The plotted position furthest to the right should be addressed as quickly as feasible, responding to specific concerns or potentially tailoring a generic package of development, compensation, and role changes.

The purpose of the talent architecture technology is to provide an overarching perspective on talent issues and opportunities based on an objective standard represented by the alignment vector and the context of the matched array display. The ability to look at an entire set of employees (e.g., a department, function, region, or business unit) enables insights and action that would ordinarily only be revealed during annual succession planning and leadership reviews, and even then, only on a time-consuming unit-by-unit review which lacks the integrated perspective essential to the development of a coherent overall program of action. From the CEO's perspective, for example, here we see five specific sets of talent issues, and a ready ability to prioritize them, craft initial responses, assign action items to relevant managers, and review progress over time. Taken together, not only does the talent architecture perspective reveal key diagnostic issues, but it shows that the actions taken will result demonstrably in improved alignment, higher quality performance, and the retention of key talent at risk.

Continuing with FIG. 15, the talent architecture redesign 1506 shows the projected talent architecture following implementation of the actions addressing the five opportunities revealed in the diagnostic. Specifically, talent at risk of separation 1501 have been removed, leadership growth has been accelerated based on issues identified in 1502, compression challenge 1503 has been relieved, high-performance talent 1504 has been coached and managed more closely toward the alignment vector, and retention-risk talent 1505 has been secured. These actions will collectively result in a future state talent architecture with greater proximity to the alignment vector, higher quality performance, and lower risk of talent loss.

Because talent is ever-changing, new or unresolved issues will continue to present themselves. For example, high potential talent that has not performed to expectations 1507 is above the alignment vector, demonstrating potential, but falling short of desired performance, perhaps due to needing training. Whatever the nature of the opportunity, the actions taken will be directed to establishing closer proximity to the alignment vector, which is a reliable proxy for the direction of improved overall performance.

While the static metrics of the talent architecture are improved by the actions taken, the resulting performance of the organization will express itself in the dynamic measures of performance: input volume; talent throughput over time; leadership yield at the top of the marched array; talent flow volume per unit time; talent velocity (speed and direction across the array); and equilibrium supply of entry, mastery, and growth talent to meet the needs of the organization.

An additional capability indicated by the observations in FIGS. 14 and 15 is that of benchmarking against organizations with normative or best practice architectures for their class of operations. In FIG. 14, talent architecture 1400 is a model after which the organization in FIG. 15 might model itself at a high level, given the relatively central talent mass. Again, tighter proximity to the alignment vector is the normative goal, and specific actions to redesign the architecture to tighten that distribution will result in improved alignment and disposition of talent and correspondingly improved operating results.

Figure 16:
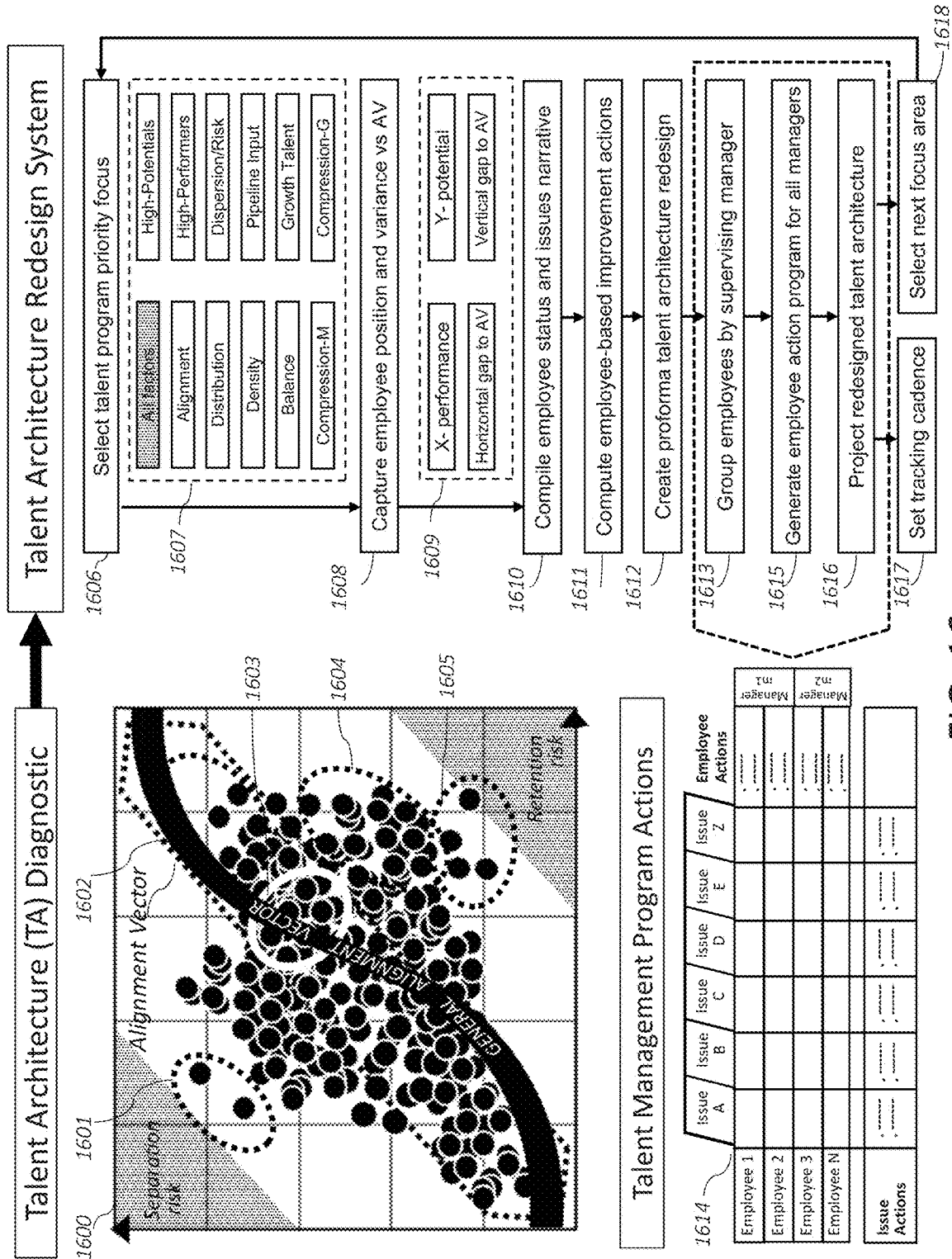
FIG. 16 shows the process steps involved in generating an automated talent architecture improvement program implementing a redesigned talent architecture.

FIG. 16 illustrates the steps involved in an embodiment of an automated system for generating a talent architecture improvement program. Talent architecture diagnostic 1600 identifies multiple areas of improvement; specifically, potential separation issues for two employees 1601, the need for growth talent 1602, compression concerns at the transition 1603 from mastery to growth, a significant high-performer recognition issue 1604, as well as potential retention risks at 1605.

These talent conditions impact real employees, and can only be addressed by taking specific talent management actions. The talent architecture enables specific diagnosis and prioritization, and shows what the modified talent architecture will look like once the proposed actions are taken. In an embodiment, the automated talent architecture modification system in FIG. 16 generates improvement actions relevant to the organization unit in 1600 by applying the following steps:

a. The process begins with the selection of a program priority focus 1606 to guide the process in the direction preferred by management. Options for priority focus are outlined in the selector 1607, including an option to pursue all factors automatically.

b. The talent architecture system then captures 1608 the coordinates x and y of each plotted employee position, storing the performance and potential ratings of the employee. Further, the system computes the orthogonal distance (horizontal and vertical gap) between the employee plotted position and the alignment vector AV, storing this information in a register 1609, and using all the collected information to generate a narrative description 1610 of the employee's performance, potential, and risk. The geometry of the alignment matrix and the direction and distance from the alignment vector define a finite range of performance and potential combinations, enabling a narrative to be generated for each combination beforehand and applied to a given case based on coordinates and position in relation to the alignment vector.

c. The same combinations of performance, potential, and risk drawn from a repository of improvement actions 1611 accessed and compiled by the system. All of these remedies will require scrutiny and refinement by the employee's manager.

d. The system has enough information about planned actions and intended effects to project a proforma modified talent architecture 1612. This provides an opportunity to approve or revise actions, timing, or direction to achieve the desired talent architecture.

e. The talent architecture system groups employees 1613 according to their reporting manager for follow through action and tracking.

f. The system data underlying the talent architecture is similar to a relational database 1614, consolidating all employee issues and actions into an overall talent management program 1615 for assessment and tracking by senior leaders.

g. The system then generates a projected talent architecture modification 1616 representing the impact of all successfully completed talent actions.

h. Next, the talent architecture system generates scheduling cadence options 1617 for tracking manager progress against key employee actions. This architecture can be generated on an interim basis to track progress toward the fully-completed end state.

i. Finally, the system operator can select additional issues or priorities to focus on 1618, cycling back to the start 1606, iterating potentially through complete delineation of all talent issues and their corresponding impact on the redesigned talent architecture.

One use of the talent architecture modification system will be to reverse engineer discovery of the talent actions to take. Specifically, this is accomplished by reviewing the diagnostic insights from measuring alignment, distribution, balance, density, and dispersion in the initial talent architecture, and then moving the graphic representation of employee plotted positions to desired positions. The system would then decompose the horizontal (performance) and vertical (potential) distances between initial and new employee plotted positions, and use the direction and extent of change required to pull from the inventory of management actions those that are relevant to delivering the desired changes registered between initial and desired employee positions. These actions become the system-determined employee improvement actions.

Turning to FIG. 17, a computing device on which the techniques described herein may be carried out is shown. The computing device, generally labelled 1700 includes logic circuitry 1702 (e.g., one or more microprocessors, microcontrollers, application-specific integrated circuits, or field-programmable gate arrays), a primary memory 1704 (e.g., volatile memory, random-access memory), a secondary memory 1706 (e.g., non-volatile computer-readable media), user input devices 1708 (e.g., a keyboard, mouse, or touchscreen), a display 1710 (e.g., an organic, light-emitting diode display), and a network interface 1712 (which may be wired or wireless). The memories 1704 and 1706 store instructions and data. The logic circuitry 1702 executes the instructions and uses the data to carry out various procedures including, in some embodiments, the methods described herein.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A method for displaying talent values of a plurality of employees of an organization in a two-dimensional array, the method, implemented on a system including at least one display device and at least one input device, comprising:
    (a) displaying a grid of cells of the two-dimensional array on the at least one display device;
    (b) displaying, on the at least one display device, an X-axis of proxy values for organization talent metrics adjacent to the grid, and a Y-axis of proxy values for corresponding employee talent metrics adjacent to the grid, and displaying an alignment vector defined by cells or portions of cells of the two-dimensional array which represent a target range of combinations of organization and employee talent metric proxy values;
    (c) receiving, by the at least one input device, an input of a first metric reflecting a talent value of a first employee of the plurality of employees from a perspective of the management of the organization;
    (d) scaling the first metric to convert the first metric into a first proxy value;
    (e) receiving, by the at least one input device, an input of a second metric reflecting a talent value of the first employee from a perspective of the employee;
    (f) scaling the second metric to convert the second metric into a second proxy value; and
    (g) on the at least one display device, displaying a plotted talent position of the first employee in a cell of the array that corresponds to an intersection of the first proxy value and the second proxy value;
    (h) repeating steps (c) through (g) for additional employees of the plurality of employees of the organization.

2. The method of claim 1, wherein the method is implemented on a human capital management system.

3. The method of claim 1, wherein the at least one input device comprises a first user interface for receiving the first metric, and a second user interface for receiving the second metric.

4. The method of claim 1, wherein the at least one input device receives one or more survey data inputs.

5. The method of claim 1, wherein the at least one input device receives one or more analytical data inputs.

6. A method for specifying a structure of the talent architecture of an organization based on talent values of a plurality of employees of the organization, the method comprising:
- receiving x and y values corresponding to a combination of employee first and second talent metrics for the plurality of employees;
- scaling the x and y values to a series of corresponding x and y proxy values;
- displaying, on a display device, a two-dimensional array as a plurality of cells, wherein each cell corresponds to a combination of employee first and second talent metric proxy values;
- determining the plurality of cells that correspond to the x and y proxy values;
- on the display device, displaying plotted talent positions for the plurality of employees on cells of the array at intersections of the corresponding x and y proxy values for each of the employees;
- displaying on the two-dimensional array an alignment vector defined by cells or portions of cells of the two-dimensional array which represent a target range of combinations of first and second talent metric proxy values;
- specifying the structure of the talent architecture by measuring the plotted talent positions for the plurality of employees in relation to the alignment vector of the array.

7. The method of claim 6, wherein the structure of the talent architecture is measured based at least in part by at least one of (a) an alignment of the employee plotted talent positions in relation to the alignment vector, (b) a distribution of the plotted talent positions relative to the alignment vector, (c) a density of the plotted talent positions, and (d) a balance among the plotted talent positions along the alignment vector.

8. The method of claim 6, wherein employee risk in the talent architecture is measured by a dispersion of the plotted talent positions around the alignment vector.

9. The method of claim 6, further comprising displaying whether the plotted talent positions can be more closely aligned to the alignment vector by adjusting at least one of the first talent metric and the second talent metric values for at least one of the plurality of employees.

10. The method of claim 6, further comprising prompting at least one of management and the employees to more closely align the plotted talent positions to the alignment vector by adjusting at least one of the first talent metric and the second talent metric values for at least one of the plurality of employees.

11. The method of claim 6, wherein the talent values for the plurality of employees are received and plotted at a first point in time, and updated talent values for the plurality of employees are received and plotted at a second point in time, and further displaying whether the talent architecture created by the updated talent values with respect to the talent architecture based on the talent values plotted at the first point in time results in structural measures closer to, farther away from, or within the alignment vector.

12. A method for modifying a talent architecture of an organization based on adjusting talent values of at least one employee of a plurality of employees of the organization, the method comprising:
- receiving initial x and y values corresponding to a combination of employee first and second talent metric values for the plurality of employees;
- scaling the initial x and y values to a series of corresponding x and y proxy values;
- displaying on a display device a two-dimensional array as a plurality of cells, wherein each cell of the plurality of cells corresponds to initial plotted positions of a combination of employee first and second talent metric proxy values;
- displaying on the two-dimensional array an alignment vector defined by cells or portions of cells of the two-dimensional array which represent a target range of combinations of first and second talent metric proxy values;
- evaluating an alignment, distribution, density, balance, or dispersion of the talent architecture;
- identifying desired changes in the talent architecture;
- prompting a user to update a position of at least one employee plotted on the array by changing at least one value of a first talent metric and a second talent metric;
- receiving adjustments in x and y values corresponding to the first and second talent metrics for the at least one employee of the plurality of employees to create adjusted x and y values corresponding to the first and second talent metrics for the at least one employee;
- scaling the values of the adjusted x and y values for the at least one employee of the plurality of employees to corresponding adjusted x and y proxy values;
- on the display device, generating a modified talent architecture by displaying plotted talent positions for the plurality of employees on cells of the array at intersections of the adjusted x and y proxy values corresponding to updated plotted positions of each of the employees for which adjusted x and y values have been created.

13. The method of claim 12, wherein a position of the cell on the array in relation to the alignment vector indicates a perspective on a relative performance and potential of the employee.

14. The method of claim 12, wherein the alignment, distribution, density, balance, and dispersion of the talent architecture reflect a relative performance, potential, and risk of an employee talent pool displayed on the array.

15. The method of claim 12, wherein the initial x and y values and the adjusted x and y values are received via different user interfaces.

16. The method of claim 12, wherein the initial x and y values and the adjusted x and y values are received via one or more survey data sources.

17. The method of claim 12, wherein the initial x and y values and the adjusted x and y values are received via one or more analytical data input sources.

18. The method of claim 12 further comprising:
- after the step of displaying the alignment vector, identifying at least one employee of the plurality of employees and measuring the initial plotted positions for the at least one employee in relation to the alignment vector;
- generating a program of talent management actions for the at least one employee based on measurement of the initial plotted positions for the at least one employee in relation to the alignment vector;

adjusting, according to the program, the initial x and y values for the at least one employee of the plurality of employees to create adjusted x and y values for the at least one employee;

scaling the adjusted x and y values for the at least one employee of the plurality of employees to corresponding adjusted x and y proxy values;

on the display device, automatically generating a modified talent architecture by displaying plotted talent positions for the plurality of employees on cells of the array at intersections of the adjusted x and y proxy values corresponding to updated plotted positions of each of the employees for which adjusted x and y values have been created;

generating instructions directing execution of actual personnel or talent management changes consistent with the modified talent architecture.

19. The method of claim 18, wherein, instead of adjusting the initial x and y values corresponding to the employee first and second talent metrics for the at least one employee, the adjusting step is performed to adjust the x and y proxy values of the at least one employee in the talent architecture to generate correspondingly-adjusted x and y talent metric values for the first and second talent metrics of the at least one employee constituting the modified talent architecture.

20. The method of claim 18, wherein instructions directing execution of actual personnel or talent management changes consistent with the modified talent architecture are released only after review and approval by management.

21. The method of claim 18, wherein a description of a performance and potential of each employee is generated automatically based on the employee plotted position in relation to the alignment vector.

22. The method of claim 18, wherein instructions directing execution of the actual personnel or talent management changes consistent with the modified talent architecture are issued to organizational unit managers based automatically on which employees are members of organizational units of the organizational unit managers.

23. The method of claim 12, wherein the method is implemented on a human capital management system.

* * * * *